(12) United States Patent
Rafii

(10) Patent No.: US 8,773,512 B1
(45) Date of Patent: *Jul. 8, 2014

(54) PORTABLE REMOTE CONTROL DEVICE ENABLING THREE-DIMENSIONAL USER INTERACTION WITH AT LEAST ONE APPLIANCE

(75) Inventor: Abbas Rafii, Palo Alto, CA (US)

(73) Assignee: Aquifi, Inc., Palo Alto, CA (US)

(*) Notice: Subject to any disclaimer, the term of this patent is extended or adjusted under 35 U.S.C. 154(b) by 265 days.

This patent is subject to a terminal disclaimer.

(21) Appl. No.: 13/507,446

(22) Filed: Jun. 29, 2012

Related U.S. Application Data

(63) Continuation-in-part of application No. 13/506,743, filed on May 14, 2012, now Pat. No. 8,686,943.

(60) Provisional application No. 61/571,540, filed on Jun. 30, 2011.

(51) Int. Cl.
*H04N 11/02* (2006.01)
*G02B 5/124* (2006.01)
*A63F 13/06* (2006.01)
*G06F 3/01* (2006.01)

(52) U.S. Cl.
CPC ............... *G06F 3/017* (2013.01); *G02B 5/124* (2013.01); *A63F 13/06* (2013.01)
USPC .................... 348/47; 375/240.02; 375/240.23

(58) Field of Classification Search
CPC ..................................................... G06F 3/017
See application file for complete search history.

(56) References Cited

U.S. PATENT DOCUMENTS

| 8,180,114 B2 * | 5/2012 | Nishihara et al. ............. 382/114 |
| 8,602,887 B2 * | 12/2013 | Tardif et al. .................... 463/30 |
| 8,686,943 B1 * | 4/2014 | Rafii .............................. 345/158 |
| 8,693,724 B2 * | 4/2014 | Ahmed et al. ................ 382/103 |
| 2009/0103780 A1 | 4/2009 | Nishihara |
| 2010/0110384 A1 * | 5/2010 | Maekawa ........................ 353/10 |

* cited by examiner

*Primary Examiner* — William C Vaughn, Jr.
*Assistant Examiner* — Luis M Perez
(74) *Attorney, Agent, or Firm* — Michael A. Kaufman, Esq.

(57) ABSTRACT

A portable remote control device enables user interaction with an appliance by detecting user gestures made in a hover zone, and converting the gestures to commands that are wirelessly transmitted to the appliance. The remote control device includes at least two cameras whose intersecting FOVs define a three-dimensional hover zone within which user interactions are imaged. Separately and collectively image data is analyzed to identify a relatively few user landmarks. Substantially unambiguous correspondence is established between the same landmark on each acquired image, and a three-dimensional reconstruction is made in a common coordinate system. Preferably cameras are modeled to have characteristics of pinhole cameras, enabling rectified epipolar geometric analysis to facilitate more rapid disambiguation among potential landmark points. As a result processing overhead and latency times are substantially reduced. Landmark identification and position information is convertible into commands that alter the appliance behavior as intended by the user's gesture.

20 Claims, 13 Drawing Sheets

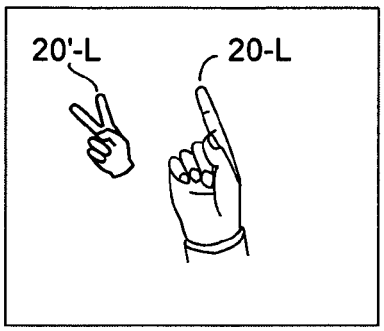
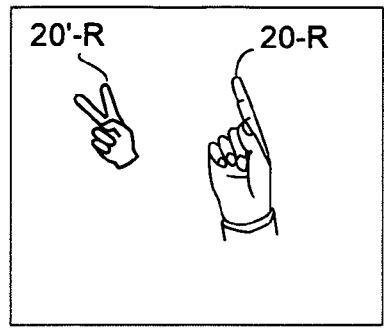
FIG. 5D          FIG. 5E
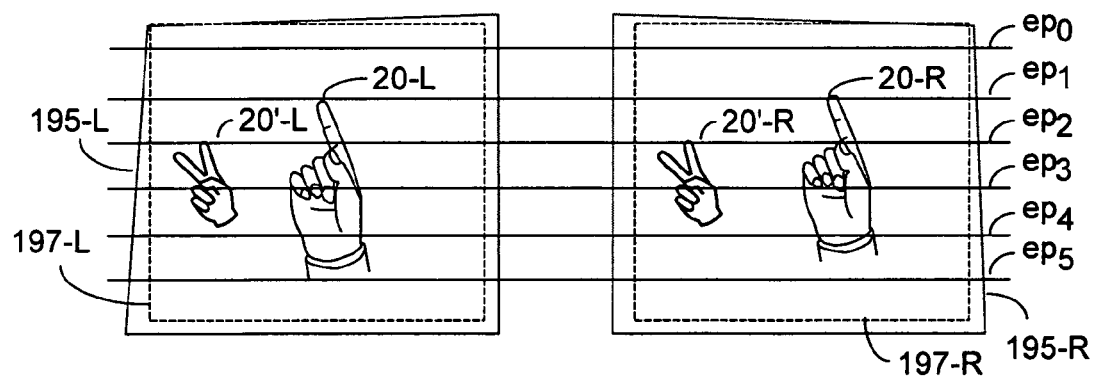
FIG. 5F          FIG. 5G

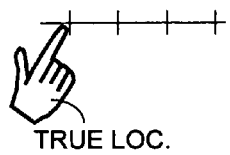 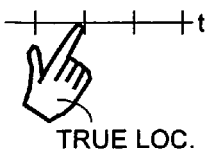 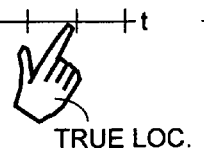 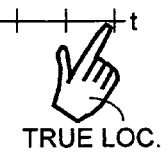
TRUE LOC.          TRUE LOC.          TRUE LOC.          TRUE LOC.
FIG. 6A            FIG. 6B            FIG. 6C            FIG. 6D
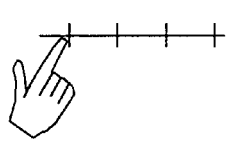 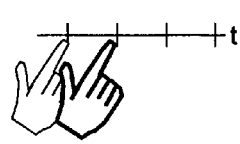 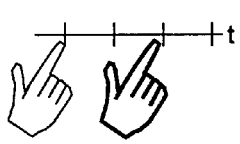 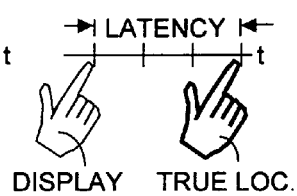
DISPLAY   TRUE LOC.
FIG. 6E            FIG. 6F            FIG. 6G            FIG. 6H
(PRIOR ART)       (PRIOR ART)       (PRIOR ART)       (PRIOR ART)
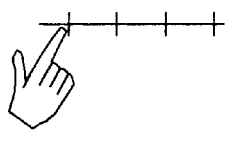 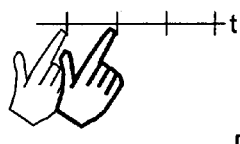 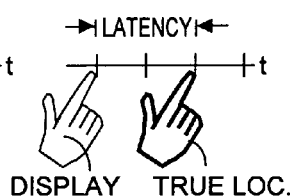
DISPLAY  TRUE LOC.
FIG. 6I            FIG. 6J            FIG. 6K

PORTABLE REMOTE CONTROL DEVICE ENABLING THREE-DIMENSIONAL USER INTERACTION WITH AT LEAST ONE APPLIANCE

RELATIONSHIP TO CO-PENDING APPLICATION

This application is a continuation of applicant's U.S. provisional patent application Ser. No. 61/571,540, filed on 30 Jun. 2011, entitled "Remote Control System with 3D Natural Interface Input", and is a continuation-in-part of applicant's co-pending U.S. utility patent application Ser. No. 13/506,743 filed on 14 May 2012 entitled "Two-Dimensional Method and System Enabling Three-Dimensional User Interaction With a Device".

FIELD OF THE INVENTION

The invention relates generally to methods and systems enabling a user to interact remotely and wirelessly with an electronic appliance using a handheld remote control device. User interactions and natural user gestures are made in a three-dimensional hover zone near the device, which includes a system that captures the user's movements, e.g., optical capture. The captured data is processed, within or external to the device, to recognize user gestures. These gestures are associated with user-intended commands that are transmitted wirelessly to control an appliance. Preferably the remote control device is fabricated using generic, inexpensive, low power consumption, consumer grade components.

BACKGROUND OF THE INVENTION

Remote control of an electronic appliance by a user is often accomplished using a handheld device with a number of buttons, e.g., a TV remote control. As the user presses a button, an associated wireless signal is emitted to remotely control the appliance, perhaps changing channels, or volume level. But such mechanisms are quantized in the sense that their remote control output command sets are rather limited by the number of discrete remote control buttons.

Some remote control devices include a touch screen that the user contacts to control a remote device. But such remote control device can only detect user interactions that contact the touch screen, and cannot detect user gestures made in three-dimensional space away from the touch screen surface. Some touch screen devices employ electromagnetic and/or capacitive technologies that try to sense presence of an object close to the touch screen. This proximity requirement tends to restrict sensing natural ad hoc gestures made in three-dimensional space.

What is needed is a method and portable or handheld remote control device to sense user interaction, including natural interface gesture interaction, in a three-dimensional zone to remotely control at least one appliance. Typically the depth of this zone will be less than the arm length ($\leq 1$ m) of the user, which is a comfortable range distance for the device. The remote control device is preferably implemented with low power consumption generic inexpensive components that have small form factor. The remote control device should process data to reduce imaging ambiguities and substantially expedite processing of a sparse number of three-dimensional data points needed to identify user gestures, including natural user interactions with the device. Transmitted commands from the remote control device system should meet applicable industry standards of accuracy and resolution.

The present invention provides such systems and methods for implementing such systems.

SUMMARY OF THE PRESENT INVENTION

The present invention provides a handheld or portable remote control device that is used to sense user gestures including natural gestures made within a three-dimensional hover zone. The device preferably includes an acquisition system, a processor system, and an input/output system with transceiver capability.

The acquisition system captures user position and movements within the hover zone, using at least one and preferably at least two two-dimensional cameras operationally coupled in a grid to optically capture user images two-dimensional (x,y) data. Each camera has an image plane that defines (x,y) coordinates, which plane is substantially parallel to the front service of the device. As used herein, a z-axis is defined normal to the x-y plane, and projects outwardly therefrom in the direction of the user. As the remote control device is typically handheld, a range of operation comfortable to the user would be out to about an arm's length, e.g., typically $z \leq 1$ m from the device. In another embodiment the acquisition system includes a time-of-flight (TOF) system that can acquire (x,y,z) three-dimensional data directly from a user in its hover zone. Structured light may be used as a three-dimensional acquisition system to detect gestures, assuming reliably precise operation over a $z \leq 1$ m or so range is attained at an acceptable implementation and power consumption cost. In addition to an acquisition system, a device according to the present invention further includes a signal processing system that processes data captured by the acquisition system. The signal processing system may be distributed in that it can be disposed within the device housing or, in some embodiments, disposed at least partially external to the device housing, e.g., in a cloud or in a remotely located processor system. Any such externally disposed processing system communicates preferably wirelessly with the remotely located appliance, and with the remote controller device, directly or indirectly through the appliance. The device input/output system includes a transceiver that can communicate wirelessly with appliance(s) to be controlled, and with any externally disposed signal processor system(s).

When the acquisition system includes two-dimensional camera(s), each camera captures from its own vantage point on the device gestures made by the user within the three-dimensional hover zone. This hover zone is defined by the interaction of the three-dimensional fields of view (FOV) of each camera in the grid of cameras. Cameras can be placed such that the hover zone grazes the user-facing surface of the device so as to enable user interaction directly on the device surface (x,y,0) as well as within the hover zone (x,y,z>0). In preferred embodiments the acquisition system includes at least two two-dimensional cameras, and the processor system receives substantially simultaneously two-dimensional image data from each camera. The processor system executes at least one algorithm that intelligently discards typically at least 99% of the incoming data, while extracting a relatively few so-called (x,y,z) landmark points on the imaged user that suffice to identify gesture(s). Exemplary landmark points on a hand might be the hand centroid, each finger tip, etc. Imaged user position and movements, as indicated by the locus of such (x,y,z) locations, are interpreted by the processor system as user gestures including natural user gestures.

Whether processor system components are disposed within or external to the device housing, processor system analysis preferably models each two-dimensional camera to emulate pinhole optics, which justifies use of rectified images and epipolar line geometry. These techniques enable rapid elimination of nearly all of the data being processed and rapid resolution of data ambiguities. The result is that a sparse set of perhaps only a dozen (x,y,z) landmark points on the imaged user are determined, substantially in real-time and on demand, using low power consuming, inexpensive processors.

The processor system can translate a recognized user gesture into a user-intended command. If the processor system is disposed within the device housing, the device input/output transceiver system wirelessly broadcasts the commands to the remote appliance that the user gestures were intended to control. In embodiments in which at least some of the processor system is disposed external to the device housing, unprocessed (x,y) image data from the acquisition system can be transmitted (via the input/output transceiver system) to externally disposed processor system(s), but at the cost of high bandwidth. More preferably, housed within the remote control device housing is at least some of the processor system such that some pre-processing of the raw (x,y) camera data is carried out and transmitted with a narrower bandwidth to at least one externally disposed processing system. The externally disposed processing system then processes the transmitted data, discerns the landmark points, identifies gestures, and then transmits appropriate commands to the appliance that the user wishes to control. In some embodiments the externally disposed processing system can transmit commands to the device, whose input/output transceiver system then broadcasts commands to the appliance in question.

In some embodiments, the remote control device includes a display screen that can replicate at least portions of imagery on the device being controlled by user gestures, such device being perhaps a smart TV, a computer display, etc. The user can view and interact with such images displayed on the handheld device, to control the appliance. If desired, the user can also interact with the device while viewing a display on the appliance. Without limitation, appliances that may be remotely controlled with the present invention include a TV, a computer system, a set top box, a game console, a kiosk, a signage unit, as well as "dumb" appliances such as a lighting system, a door lock system, etc.

In another embodiment, the acquisition system is a time-of-flight (TOF) system that determines depth distance to the user by comparing phase shift between emitted optical energy and such energy reflected back from the user. The TOF system creates true three-dimensional data, albeit a great deal of such data, representing locations on the user. Such data is discerned by the processor system as user-made gestures that are used to remotely control the appliance using the transceiver system in the handheld remote control device.

Other features and advantages of the invention will appear from the following description in which the preferred embodiments have been set forth in detail, in conjunction with their accompanying drawings.

BRIEF DESCRIPTION OF THE DRAWINGS

FIG. 5B-FIG. 5G depict use of epipolar-line camera system geometric properties to disambiguate multiple corresponding potential landmark candidates, according to embodiments of the present invention;

FIGS. 6A-6K depict latency improvements provided by embodiments of the present invention;

DETAILED DESCRIPTION OF THE PREFERRED EMBODIMENTS

Figure 1:
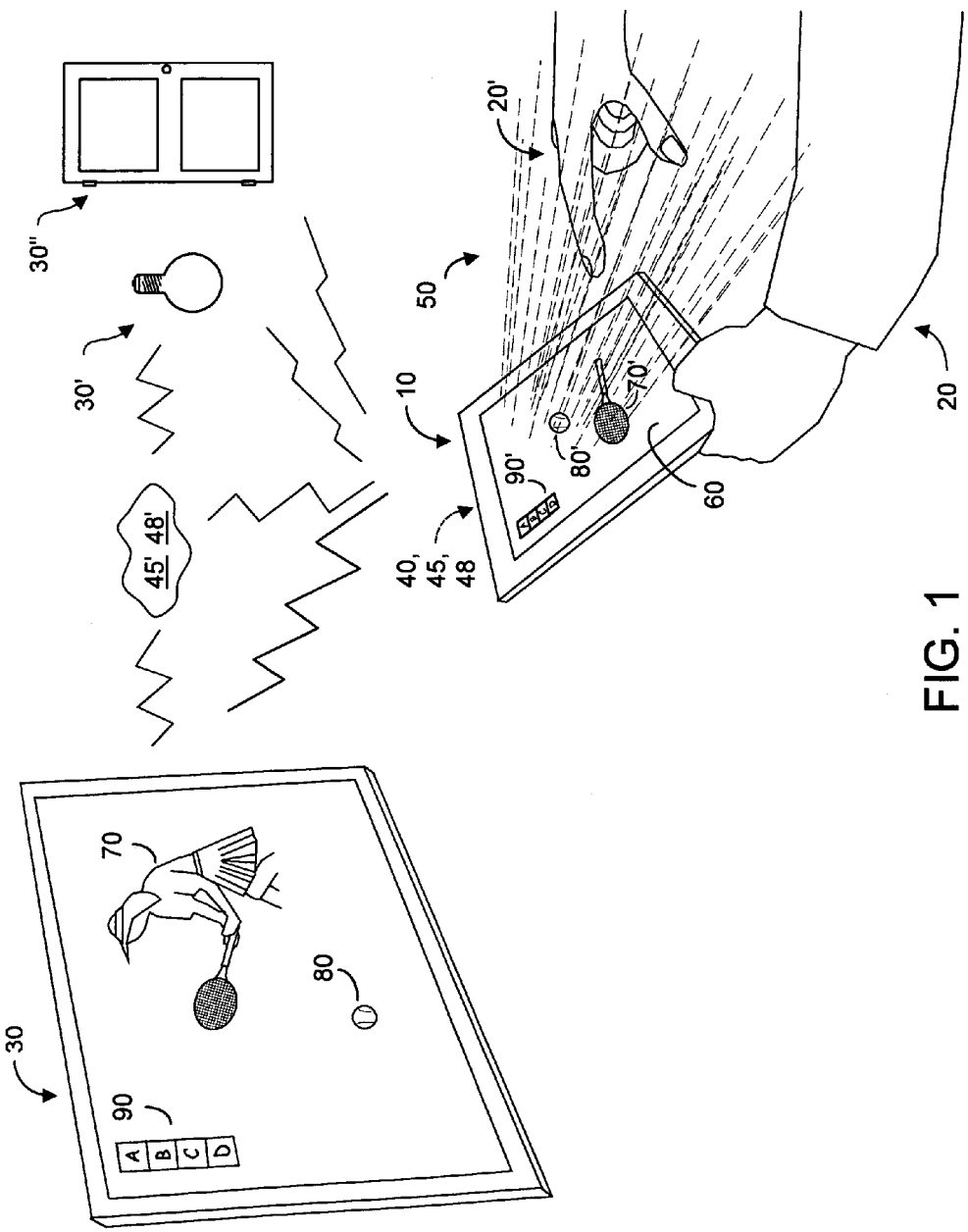
FIG. 1 is a perspective view of a handheld remote control device, according to embodiments of the present invention.

FIG. 1 depicts a portable handheld remote control device 10, according to embodiments of the present invention. Device 10 is shown held by a user 20 so as to enable user gestures including natural user gestures, here made with right hand 20', to be imaged and interpreted and translated into commands appropriate to the gesture. Device 10 includes systems that can generate commands appropriate to the gesture and can transmit these commands wirelessly (indicated by zigzag lines) to appliances such as smart TV or computer 30, or relatively dumb device 30', 30" exemplified by room or building light(s), building door lock(s) 30''', etc. As used herein the terms "wireless" and "wirelessly" are understood to refer to typically two-way transmission made via RF (which includes WiFi and Bluetooth), IR, etc. Such wireless transmissions are shown in the figures as zigzag lines. More specifically, device 10 includes an acquisition system 40, a signal processor system 45, and an input/output transceiver (I/O transceiver) system 48. Processor system 45 may be disposed entirely within device 10, or may be disposed in whole or in part externally to device 10, as in a cloud or external processor system 45'. In embodiments that include an external processor system 45', such external processor system includes its own transceiver capability 48' and can wirelessly communicate with device 10, and/or with appliances such as 30, 30', 30".

According to the present invention, position and movement of at least a portion of user 20, e.g., right hand 20' in FIG. 1, within a three-dimensional hover zone 50 are acquired by acquisition system 40. If acquisition system 40 is a time-of-flight (TOF) system, hover zone 50 is defined by the TOF system field of view (FOV). If acquisition system 40 is a single two-dimensional camera, then hover zone 50 is the FOV of the camera. More preferably acquisition system 40 includes at least two two-dimensional cameras, in which case hover zone 50 is defined by the intersection of the FOV of each of the cameras. Processing system 45, 45' uses image data (three-dimensional data if acquisition system 40 is three-dimensional, e.g., a TOF system, (two-dimensional data of acquisition system 40 includes at least one two-dimensional camera) acquired from the user in hover zone 50, to identify and recognize user gestures.

Such gestures, which can include natural user gestures, are made by the user with the intent to control a device, e.g., 30, 30', 30". For example an upward arm gesture might command an upward channel change in a smart TV appliance 30. When acquisition system 40 includes at least two two-dimensional camera, processor system 45, 45' determines from the incoming two-dimensional (x,y) data a relatively few landmark points (x,y,z) on the user that can define user gestures. Preferably using methods that include edge detection, skin color modeling, machine learning, pinhole camera modeling, epipolar geometry, image rectification and three-dimensional reconstruction, processor system 45, 45' rapidly extracts the few (typically less than one-hundred and generally less than about a dozen) landmark points. The perceived user movement is matched with an associated gesture and appropriate command(s) are generated by processor system 45, 45'. These command(s) are wirelessly broadcast by I/O transceiver system 48 and/or 48' to appliance(s) to be controlled and/or to device 10. In some embodiments hand held device 10 includes a display screen 60 that can wirelessly replicate at least some images on appliance 30. For example if appliance 30 is a smart TV or perhaps a computer system monitor whereon is displayed an image of a tennis player 70 hitting a tennis ball 80, and an exemplary menu selection 90. Some or all of these images are shown on display 60, as 70', 90'.

As described later herein, embodiments of the present invention can sense multiple gestures that may be implemented as commands transmitted wirelessly to interact with an appliance, e.g., 30, 30', 30", or interact with to alter a displayed image, e.g., tennis ball 80, a menu 90. With respect to interacting with displayed images, gestures may include without limitation zooming, panning, rotating, moving, etc. Gestures can be captured in raw format that best describes location and motion of perceived user interactions. The present invention is flexible in determining at what processing state a raw data capture should be interpreted as a high level command. High level commands and raw representations can be described as a series of event names, event identification, and optionally can be associated with three-dimensional locations, and angle and velocity information.

Thus in FIG. 1, user 20 may manipulate right hand 20' to "play" virtual tennis with player 70 displayed on appliance 30. The user may "return" tennis ball 80 by virtually swatting it with virtual tennis racket 70' by moving right hand 20' within hover zone 50. The movement of right hand 20' is acquired by acquisition system 40 as positional data, three-dimensional data if system 40 includes a TOF system, or two-dimensional data if system 40 includes two-dimensional camera(s). Processor system 45 (and/or externally located processor system(s) 45') can determine direction and force of such user hand movement, and discern the appropriate user-intended gesture, and determine the appropriate command for the appliance, here 30. I/O transceiver system 48 (or 48' if disposed external to device 10) transmits the command to appliance 30, whose internal software in response to the received command will render ball 80 in a new trajectory commensurate with the user's "return", presumably generally toward virtual player 70. If, as shown, device 10 includes a display screen 60, all or some of the displayed images on appliance 30 may be transmitted to the device for display. (For ease of illustration, FIG. 1 only depicts tennis racket 70' and menu 90' on the device display screen 60.)

In FIG. 1 the user may interact with "dumb" appliances such as a lighting system 30', a door locking system 30" by making appropriate gestures within hover zone 50. For example an upward movement of hand 20' within hover zone 50 may be interpreted by device 10 as brighten room lighting appliance 30', whereupon device 10 would wirelessly transmit appropriate command(s) to lighting system appliance 30'. In another example, a rotation of hand 20' clockwise may be interpreted as "lock the door", and upon detecting such gesture, device 10 would transmit wirelessly command(s) causing door system appliance 30" to lock, etc. In controlling such appliances where visual display on device 10 is not required, device 10 may omit display screen 60.

In one embodiment of the present invention, acquisition system 40 is a time-of-flight (TOF) system, such as those described in many U.S. patents awarded to Canesta, Inc., formerly of Sunnyvale, Calif. Such TOF systems emit active optical energy and determine distance (x,y,z) to a target (here user 20') by counting how long it takes for reflected-back emitted optical energy to be sensed, or by examining phase shift in the reflected-back emitted optical energy. The TOF sensor is an array of pixels, each of which produces a depth (z) signal and a brightness signal for the imaged scene. The pixel array density will be relatively low, in the QVGA or VGA class, yet the silicon size will be rather large because a typical TOF pixel is many times larger than a typical RGB camera pixel. TOF systems acquire true three-dimensional data with no need for triangulation to detect an (x,y,z) location of an object (perhaps 20') on surface 60 (x,y,0) or in three-dimensional region (x,y,z>0) 50. A TOF system enables user 20 to make natural gestures and movements that acquisition system 40 can sense, and processor system 45 (and/or 45') can recognize as commands that system 48 (and/or 48') can wirelessly cause alteration of operation of appliance(s), e.g., 30, 30', 30".

Although they can provide true three-dimensional (x,y,z) data representing a user, TOF systems can be relatively expensive to implement and can require substantial operating power. Environmental factors such as high ambient light, system temperature, pixel blooming, electronic noise, and signal saturation can all affect the accuracy of the acquired (x,y,z) data. Operational overhead associated with acquiring three-dimensional data can be high. Identifying a user's finger for purposes of recognizing a gesture in an (x,y,z) zone within the FOV need only require identifying perhaps ten points on the finger. But a TOF system cannot simply provide three-dimensional data for ten points but must instead image the entire user's hand. For example, a TOF system with a VGA-class sensor array acquires (640·480) or 307,200 (x,y) pixel locations from which the system might produce perhaps 80,000 to 300,000 (x,y,z) location points. Such immense data requires substantially processing, even though only perhaps ten data points are necessary to identify (x,y,z) information. Thus while system 40 may include a TOF system, there are substantial cost, form factor, operating power, and processing overhead associated with TOF systems.

Prior art systems that dispose acquisition system sensors directly on appliance 30, must sense user position and movement over a z-range depth that may be several meters. Consequently depth resolution must encompass a large volume and degrades with distance as a quadratic function of depth distance. By contrast, the present invention disposes the acquisition system on remote control device 10, which at most will be within an arm's length of the user, and typically within tens of cm from the user. Consequently depth resolution encompasses a relatively smaller volume and for a given acquisition system 40, a higher useful resolution in (x,y,z) is realized, with the result that finer details of user gestures can be detected.

As noted, embodiments of the present invention may be implemented with acquisition system 40 comprising a TOF system, or a structured light system. However, there are substantial advantages to implementing a handheld device 10 whose acquisition system 40 comprises at least two two-dimensional cameras to acquire two-dimensional (x,y) data by imaging the user. Table 1 below tabulates differences in various features between various embodiments of the present invention. Note the many advantages realized by use of at least two two-dimensional cameras in acquisition system 40 of a remote handheld device 10. In Table 1, the 1 cm$^3$ volume represents two cameras and associated electronics. The 1 mm accuracy for such embodiments is achievable because such acquisition system is intensity and image processing based, with minimal electronic noise.

TABLE 1

| FEATURE | ≥2 TWO-DIMENSIONAL CAMERAS | TOF | STRUCTURED LIGHT |
|---|---|---|---|
| COST | Low, <$3 | High, >$50 | High, >$40 |
| POWER/HEAT | Low, <0.5 W | High, >5 W (fan or heatsink needed) | High, >10 W (fan or heat-sink needed) |
| SIZE (approx) | Tiny, 1 cm$^3$ | Large, 90 cm$^3$ | Large, 108 cm$^3$ |
| NEED CUSTOM PARTS? | No | Yes: sensor, light source, ASIC | Yes: light source, filter, ASIC |
| ACCURACY AT 0.3 M | ≈1 mm | >1 cm | probably >1 cm |

Figure 2A:
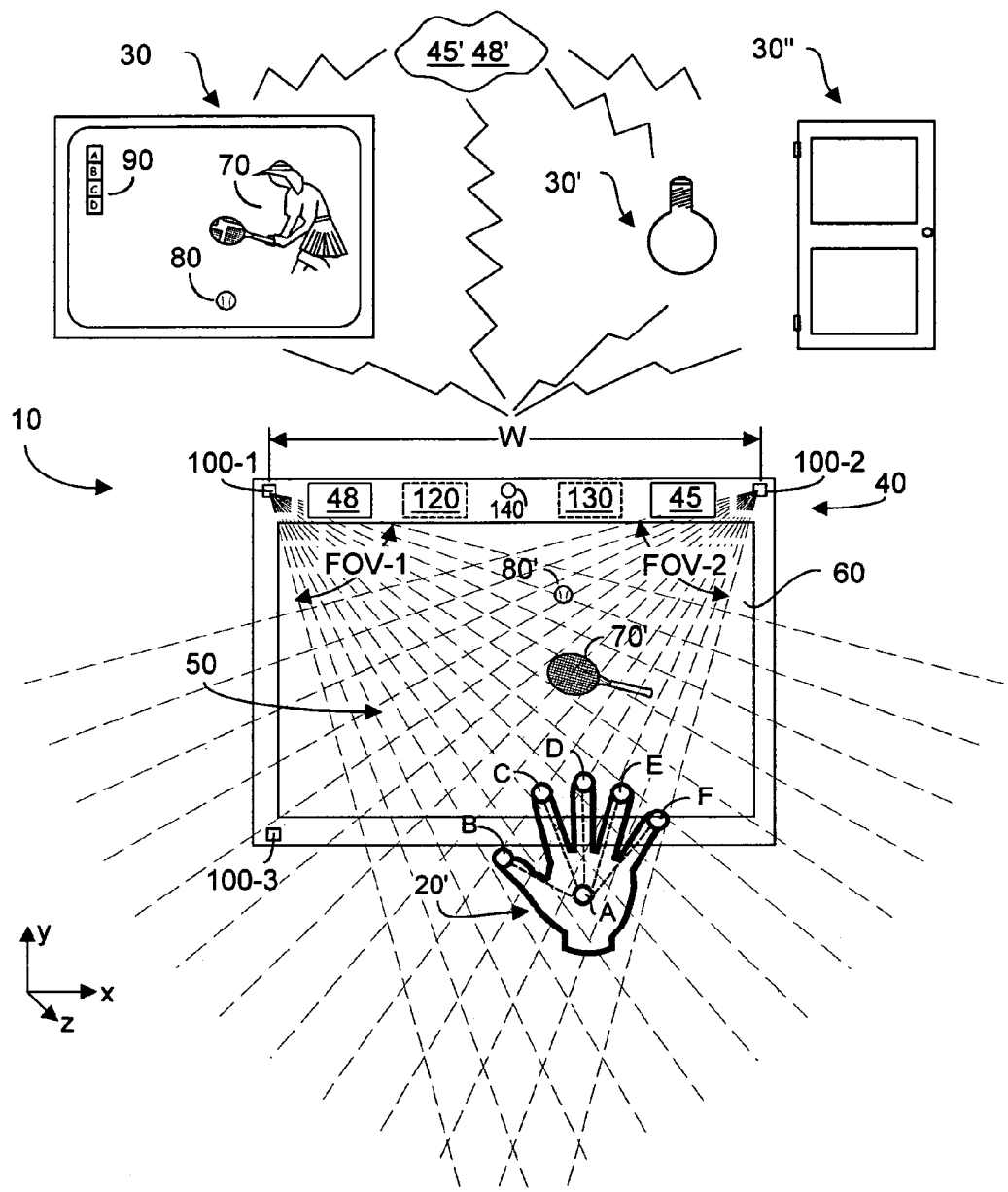
FIG. 2A is a front view of a handheld remote control device, according to embodiments of the present invention.

FIG. 2A depicts a portable or handheld remote control device 10, according to embodiments of the present invention, in which acquisition system 40 in device 10 includes at least two spaced-apart two-dimensional cameras 100-1, 100-2, etc. coupled in a functional camera grid. As in FIG. 1, device 10 includes a processor system 45 internal to the device and may include processor system (s) 45' external to the device. Referring to FIG. 2A, device 10 includes I/O transceiver system 48, and as noted externally disposed systems 48' may be present. In some embodiments remote control device 10 may optionally include gyroscope(s) 120, optional accelerometer(s) 130, and an optional light source 140. Sensors 120, 130 can output dynamic positional information of device 10 to signal processor system 45 to augment gesture recognition from cameras 100-1, 100-2. Such dynamic positional information may also be used to compensate for physical jitter of device 10, and can also be used in some applications modify computational factors such as scale, translation, and rotation. Not shown in FIG. 2A is the power supply for device 10, typically at least one battery disposed internal to the device.

In some applications, optional light source 140 may be toggled on and off synchronously via control line signals associated with internal processor system 45 such that exposure captures of cameras 100-1, 100-2, etc. can augment quality of the images they capture. The cameras can be caused to capture images with ambient optical energy alone, and with ambient optical energy augmented by source 110 optical energy. Frames of optical data captured in these two modes can be subtracted from one another to more readily capture user-reflected optical energy, thereby reducing background optical clutter. In some embodiments the magnitude of light reflected by the user can be used to estimate distance to the user, where exemplary skin reflectivity is known. Emissions from optical source 110 preferably include spectra energy for which the pixel sensor arrays in cameras 100-1, 100-2 are sensitive, e.g., visible light for RGB and monochrome cameras, and IR for cameras sensitive to IR energy. If source 140 emits IR, it must be recalled that ambient light can include IR components. If device 10 includes optional light source 140, it is understood that this light source does not project patterns of light as in structured light systems, but merely illuminates regions of space within three-dimensional hover zone 50.

As noted, device 10 includes an I/O transceiver 48 that enables preferably bilateral wireless communication with smart appliances such as 30, and bilaterally or unilaterally with dumb appliances such as 30', 30". Smart appliances such as 30 typically include TVs, computer displays, and the like. Embodiments of the present invention assume smart appliances such as 30 optionally can transmit to device 10 their response to a received command, e.g., tennis ball 80 is moving toward player 70. By contrast dumb appliances such as 30', 30" perform a more limited number of functions such as turn-on/turn-off, increase/decrease light intensity, and the like, and may not necessarily include transmit-back functionality to confirm execution of a device 10 issued command, e.g., confirm that front door has been unlocked. It is understood that FIG. 2A is not to scale in that display 60 on remote control device 10 will be substantially smaller than the display screen on appliance 30. As shown In FIG. 2A, preferably only relevant representations of images displayed on device 30 are replicated on display 60 of device 10. For example the user wants to know where racket 70' and tennis ball 80' are relative to each other, but there is no need to also render an image of tennis player 70, which is therefore not depicted on display 60.

Cameras 100-1, 100-2 are fixedly attached a distance W apart, preferably at the top corners of remote control 10 to provide good overlapping field of view coverage. Dimension W might be on the order of perhaps 7" for a tablet-sized device 10, and on the order of perhaps 2"-3" for a pocket sized device 10. A 3" spaced-apart distance is commensurate with an effective 1 m depth for hover zone 50, which is adequate for a handheld remote control device 10. These exemplary base and range distances are affected by factors including camera resolution, and precision requirements required by the appliance and application.

Advantageously a cross-section dimension of hover zone 50 parallel to the plane of display surface 60 can far, far exceed even a small dimension W, enabling device 10 to be pocket sized and yet control large display appliances 30 such as TVs and computer system displays. Each camera has a three-dimensional field of view, e.g., FOV-1 for camera 100-1, FOV-2 for camera 100-2, etc. These FOVs overlap to define a three-dimensional hover zone 50 and are depicted with dashed phantom lines. Three-dimensional hover zone 50 is shown shaded with gray, for greater ease of recognition. The cameras may be fixedly mounted on device 10 with the optical axes not parallel but rather tilted toward one another slightly with a so-called vergence angle of perhaps 5°. The resultant hover zone 50 can thus be made to slightly graze the surface of display screen 60 to detect user interaction at this surface. If device 10 does not include a display screen, then the hover zone would extend to slightly graze the corresponding surface of device 10. Such mounting facilitates detection use contact with display screen surface (x,y,0), using optical images acquired by the spaced-apart cameras. Of course detection within hover zone 50 also occurs, (x,y,z>0). An (x,y,z) coordinate system is denoted in FIG. 2A wherein the z-axis projects outwardly from the x-y plane. Within hover zone 50, which as noted may graze the user-facing surface of device 10, each camera captures from its own vantage point two-dimensional images of object(s) such as a user head or arm, e.g., right hand 20'.

In FIG. 2A assume that user 10 is holding remote control device 10 with the left hand (not shown), and will make user gestures with the right hand 20', which is drawn in outline form, with the palm facing device 10. As used herein the terms "user" and "user object", will be understood to include portions of user 20, perhaps the head or face, a hand, a finger, a fingertip, as well as any object held by the user used in gesturing, perhaps a passive stylus or wand. As described in detail later herein, a relatively few landmark points are defined on key portions of the user or user object(s). For example in FIG. 2A, the letter A denotes a landmark point at the centroid of the right hand, letters B, C, D, E, F denote landmark points at the distal end, respectively, of the right thumb, forefinger, middle finger, ring finger, and little finger. Two-dimensional camera-capture images are processed by processor system 45 (and/or 45') to reconstruction (x,y,z) three-dimensional locations of the relatively few, e.g., perhaps less than a dozen, landmark points used to define a user gesture.

The various cameras can operate cooperatively and independently albeit substantially simultaneously, under command of processor unit device 10 processor system 45. Two-dimensional frames of image data captured substantially simultaneously by each camera from that camera's vantage point are presented to processor system 45 at a known frame rate, typically 30 frames/sec although perhaps 60 frames/sec. if rapid user motion is anticipated. Cameras 100-1, 100-2, etc. are shutterable and typically employ a rolling or global shutter. If the cameras were perfect, exposures would start and end exactly simultaneously. In practice, if exposure duration is 8 ms, a start of exposure and end of exposure tolerance of about ±1 ms is acceptable, and for a 16 ms exposure, start of exposure and end of exposure tolerance of about ±1.5 ms is acceptable. Thus "substantially simultaneous" operation of cameras 100-1, 100-2, etc. is understood to mean simultaneous within a tolerance ≤±1.5 ms or ≤±10% of camera exposure duration. Since generic two-dimensional cameras 100-1, 100-2 may synchronize exposure relative to each other in sub-millisecond time, such tolerances are readily met. For example a user's hand may move rapidly at perhaps 100 mm/sec, which is a 0.1 mm movement in 1 ms, well within the tolerance for recognizing natural user interfaces. Motion blur during image acquisition is reduced preferably by operating each camera 100-1, 100-2 at a maximum gain, with commensurate shutter times, e.g., about 3 ms to about 5 ms.

In FIG. 2A, among other figures, the three-dimensional cone-shaped FOV of each camera is drawn as straight line rays (depicted as phantom lines) converting at the lens of each camera. The three-dimensional intersection of these FOVs defines the three-dimensional hover zone 50, within which user gestures can be imaged by cameras 100-1, 100-2. These cameras capture two-dimensional images of at least a portion of the user within the hover zone. In an embodiment in which a single two-dimensional camera is used, its FOV would define hover zone 50.

As described more fully later herein with respect to FIG. 7, software associated with processor system 45 processes this incoming two-dimensional data and intelligently creates three-dimensional image data not for the entire imaged scene, but preferably only for a relatively few target object potential landmark points such as A, B, C, D, E, F, etc. in FIG. 2A. As noted, however, device 10 can offload (via input/output transceiver system 48) processing tasks to remotely disposed processor(s) 45', which may be more powerful than processors within system 45. As few as a dozen or so landmark points can be sufficient to enable gesture recognition according to embodiments of the present invention. These landmarks provide semantic clues in that the landmark points are identifiable objects, e.g., portions of a user's body such as fingertip, elbow, head, etc., that are relevant to successful implementation of natural user interfaces.

Figure 2B:
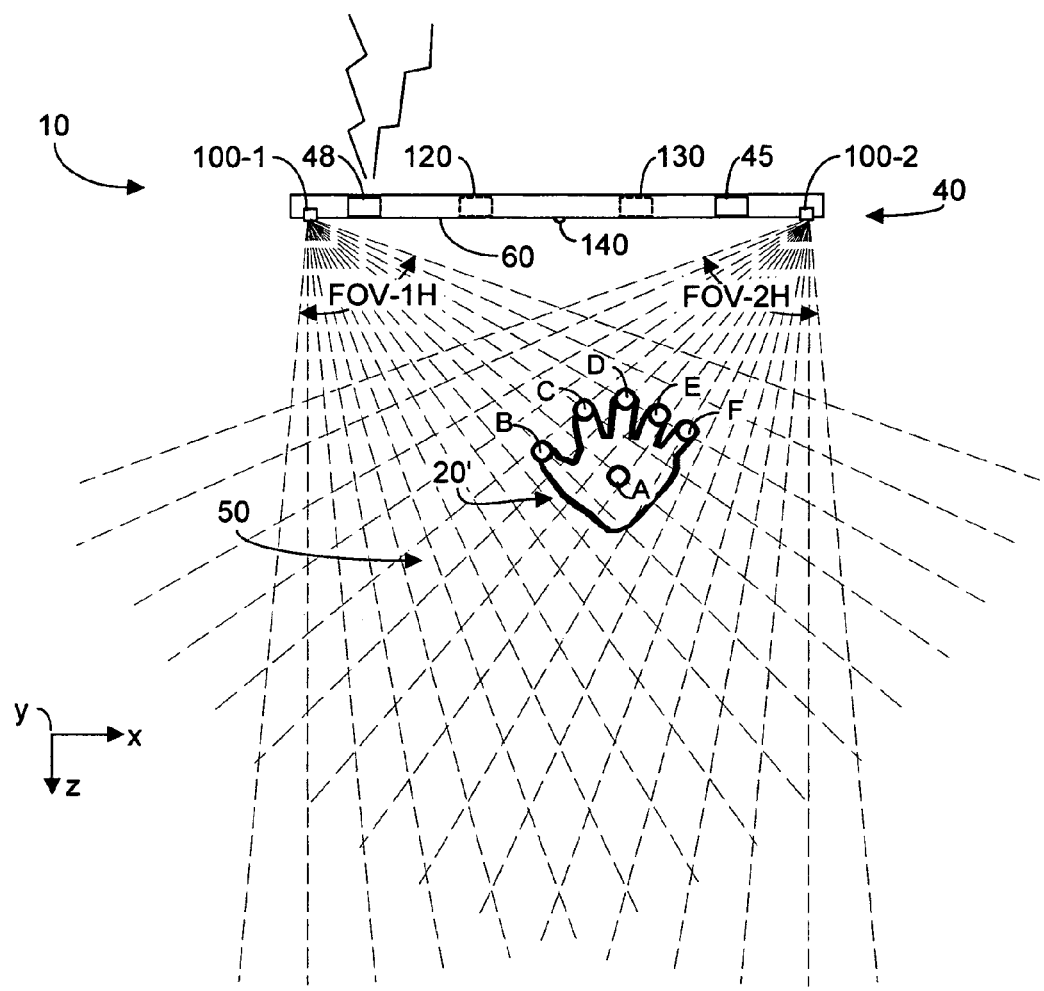
FIG. 2B is a top view of the embodiment of FIG. 2A.

FIG. 2B is a top view of what was depicted in FIG. 2A, and as shown the y-axis extends upward from the x-y plane. The fields of view shown are the horizontal fields of view (FOV-1H) for camera 100-1, which preferably has the same field of view (FOV-2H) as camera 100-2. For cameras 100-1, 100-2, etc., used with the present invention the horizontal FOVs will typically be in a range of about 40° to about 60°. In practice cameras 100-1, 100-2, etc. may be mounted on device 10 with their optical axes tilted slightly toward each other at a vergence angler of perhaps 5° to improve hover zone coverage adjacent the surface of device 10.

Figure 2C:
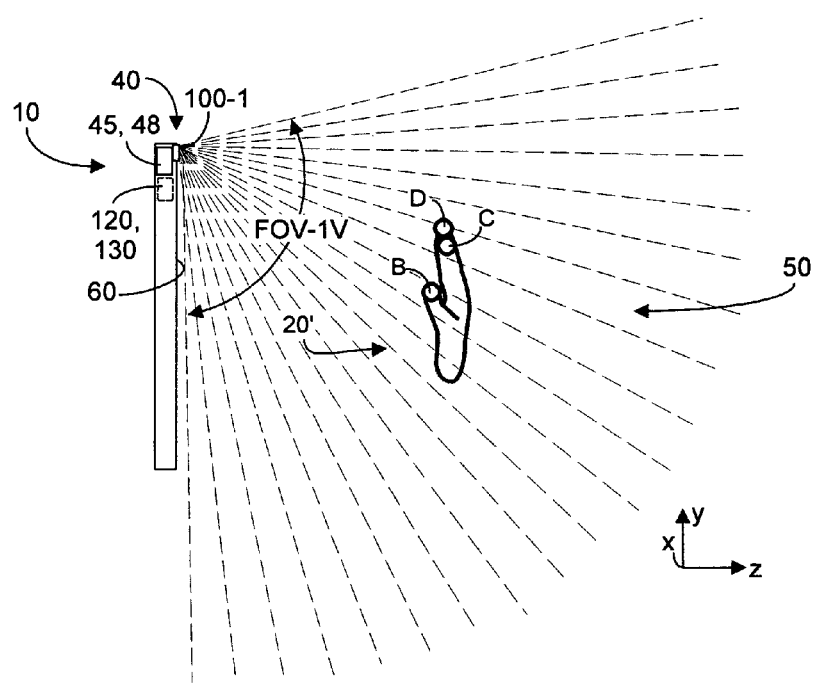
FIG. 2C is a side view of the embodiment of FIG. 2A.

In the side view shown in FIG. 2C, the vertical fields of view, FOV-1V, FOV-2V, etc. for the various cameras are shown, where these vertical FOVs will be in a range of about 40° to about 90°. In practice each camera preferably is tilted at a so-called vergence angle of perhaps 5° such that the optical axes are not parallel but rather slightly inclined toward each other, to attain the desired hover zone 50. Hover zone 50 is typically sufficiently large to image multiple objects simultaneously, perhaps a user's head and an arm, useful in recognizing some gestures.

Figure 3:
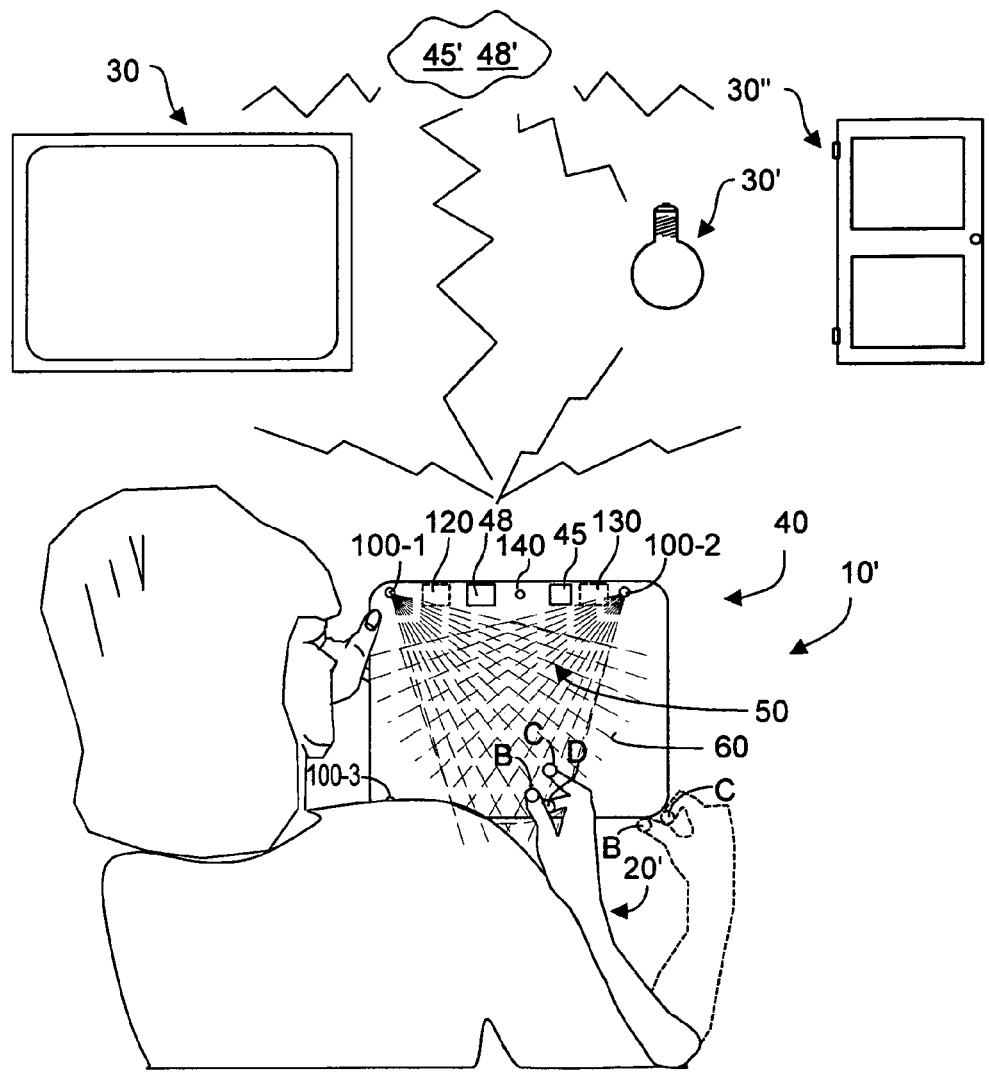
FIG. 3 is a front view of a handheld remote control device without its own display screen, according to embodiments of the present invention.

FIG. 3 is similar to FIG. 2A except that device 10' as shown has no display screen 60 that can replicate (i.e., from wireless commands issued by appliance 30) all or some of the images on a smart appliance 30. In all other aspects detection by processor system 45 (and/or 45') of user 20' gestures made within three-dimensional hover zone 50, and transmission of recognized commands appropriate to the gestures, are as described with respect to the embodiments of FIGS. 1-2C. Note that a visible light source 140 could be used to provide feedback to the user that a gesture made command transmitted to a remote dumb appliance, e.g., 30', 30" has been successfully carried out. For example if appliance 30" is an electric door lock, perhaps the front door in a home or building, user 20' may, perhaps upon hearing the doorbell ring, gesture device 10' to unlock the door. If device 10' correctly interprets the user gesture and causes an appropriate command to be wirelessly broadcast via system 48 or 48 (shown as zigzag lines), appliance 30" will unlock the front door. Preferably the door unlocking mechanism is equipped to wirelessly confirm to device 10' that the door is now in an unlocked state. Light source 140 could thus be caused to blink to visually confirm to the user that the intended gesture has been recognized and executed correctly. System 10' could also be provided with an audible feedback mechanism to audibly confirm to the user that the intended gesture was recognized and executed correctly. Thus in FIG. 3, reference element 140 may denote a combination light source and audible enunciator.

In practice, many embodiments of the present invention are implemented using OmniVision model OV7740 VGA two-dimensional cameras for cameras 100-1, 100-2, etc.; see www.ovt.com. This commercially available camera has FOV-H≈50° and FOV-V≈40°. While these relatively narrow FOVs are less than 90°, these cameras nonetheless performed adequately for gesture sensing according to the present invention. In high quantity, unit price of similar cameras is currently less than $1. In some embodiments cameras 100-1, 100-2, etc. are substantially identical with respect to sensor array pixel resolution, sensor pixel wavelength sensitivity, and fields of view. However embodiments can be implemented in which the cameras are dissimilar in at least one of these characteristics. Distance W and angular orientation of the cameras with respect to each other and to device 10 are assumed to remain fixed within certain tolerances for the life of the system product. Slight camera movements with respect to device 10 can be calibrated by the user or with auto-calibration methods.

Preferably calibration parameters for each camera 100-1, 100-2, etc. are known a priori and are stored, e.g., within camera memory (if present) or in memory associated with processor system 45, 45'. Processor system 45, 45' can use these stored camera parameters (and stored device 10 parameters) during runtime operation of device 10 to correct or at least reduce errors including camera distortion. Such correction allows the cameras to be regarded by processor system 45 as ideal cameras, e.g., pinhole cameras. So-doing enables use of extrinsic parameters, e.g., R and T parameters (described later herein) to correctly reconstruct three-dimensional ($x_w$, $y_w$, $z_w$) positional coordinates for any landmark acquired by acquisition system 40, relative to a system-mounted camera, e.g., 100-1, and relative to the global coordinate system, e.g., relative to a fixed reference.

Figure 4:
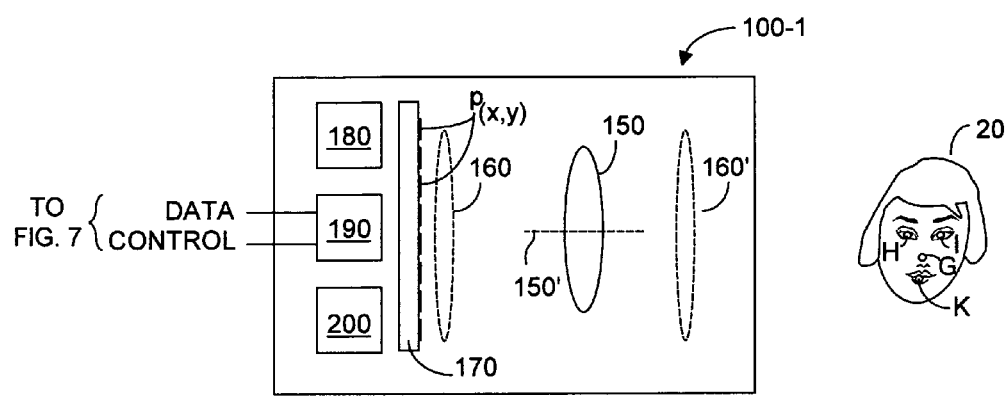
FIG. 4 is a block diagram of a generic two-dimensional camera as used with embodiments of the present invention.

FIG. 4 depicts an exemplary camera 100-1 and an object 20, showing additional exemplary landmark points: nose G, eyes H, I, mouth K. Camera 100-1 preferably includes a shutterable lens 150 having a lens optical axis 150', optional filters 160, 160', an image plane comprising a planar array 170 of sensor pixels $p_{(x,y)}$ arranged in rows and columns. Each camera preferably further includes optional processor/controller 180, control and communication interface circuitry 190 (which helps make the number of cameras in the grid of cameras readily expandable, two, three cameras, etc., see FIG. 7), and optional memory 200 (which may include volatile and non-volatile storage). Non-volatile memory can store camera calibration and other configuration data, while volatile memory can support processor programming and store temporary runtime data. As described more fully later herein with respect to FIG. 7, according to embodiments of the present invention, a grid of cameras can enable processing with single or multi-core processors, and can preferably provide vector or scalar instructions. Among other roles, each in-camera controller 180 can control the associated camera and help synchronize control and data links with other cameras, help pre-process frames, carry out some image processing stages such as segmentation, among other tasks.

In FIG. 4, sensor array 170 may be a relatively high resolution RGB (color), or gray-scale sensor array, or even an IR sensor array. Density of pixels $p_{(x,y)}$ in each camera's sensory array depends upon several factors including the smallest gesture movement made with a pointing finger that must be detected, the vertical FOV-V and horizontal FOV-H camera fields of view, and image frame size to be acquired and processed. The above-noted OmniVision model OV7740 VGA has a sensor array with pixel density 480 h×640 v, which is adequate for gesture recognition, according to embodiments of the present invention. If cameras 100-1, 100-2, etc. are RGB, preferably integrated color filters 160 are employed, arranged in a so-called Bayer pattern over the pixels on a per-pixel basis. If source 140 emits IR, and camera sensor pixel arrays 170 can detect IR, at least one of filter 160 and 160' can be an IR bandpass filter to eliminate user objects illuminated by ambient rather than IR optical energy. However the various cameras 100-1, 100-2, etc. in the camera grid for device 10 need not have identical pixel resolutions, sensor array wavelength sensitivities, etc. Camera processors/controllers 180 can also be used to provide such relatively minimal color and exposure correction as may be desirable to detect user gestures and the like, perhaps to discern skin color from other color. While FIG. 4 shows lens 150 and sensory array 170 as being centered on a common optical axis 150', in practice a slight offset may be present. Nonetheless symmetrical lenses 150 may still be used, as embodiments of the present invention can handle optical distortion associated with generic inexpensive cameras 100-1, 100-2, etc.

Figure 5A:
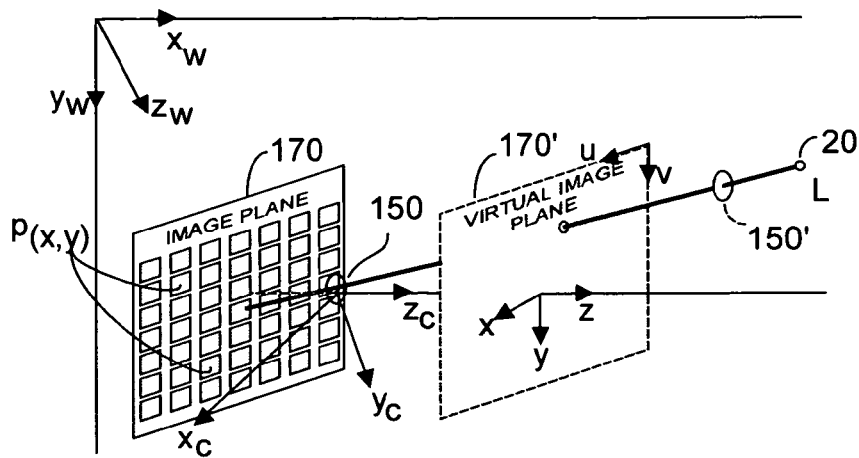
FIG. 5A depicts the relationship between world coordinates and local coordinates, according to embodiments of the present invention.

Referring to FIG. 5A, to depict the role of geometric properties of a pin-hole camera, each camera has in addition to its image plane 170, a virtual image plane 170' defined by coordinate axes ($x_c$, $y_c$). As shown, lens 150 is midway between image plane 170 and virtual image plane 170'. The number of rows and columns of pixels $p_{(x,y)}$ in array 170 is determined by the applications for which remote control device 10 is to be used. Typically array 170 is fabricated using CCD or CMOS processes, and details for determining relevant pixel density are described later herein. According to embodiments of the present invention, a preferred method of carrying out dense stereoscopically acquired depth calculations is the so-called sum of squared differences (SSD) method. SSD methodology uses a window (or kernel) having a width and a height. As noted, each camera (100-1, 100-2) captures on the camera's image plane 170-1, 170-2 an image of an object in the hover zone, and if each camera images at least part of the same object, the object will appear on each image plane. Relative shift in location on the two image planes of a commonly imaged object is termed disparity. Disparity diminishes as the distance from the camera to the object increases. In SSD methodology, the kernel or window width may be as large as the maximum disparity between two corresponding object image points. The window height may be as large as what calibration tolerance for device 10 dictates, perhaps 10 pixels. Assume cameras 100-1, 100-2 have a spaced-apart baseline W of 6 cm, and a lens 150 focal length of 1.6 mm. If device 10 had to compute depth ranging from about 12 cm to infinity, then maximum disparity size for two corresponding points in each image would be about 0.8 mm, i.e., (1.6 mm)·(6 cm)/(12 cm) or 0.8 mm. If pixel density or pitch on array 170 is 2 µm, then the number of pixels to be analyzed for possible correspondence matches may be up to 400 pixels. Assuming a kernel height of 10 pixels, brute force calculations for 10·400 pixels over each pixel in the first and second images acquired by cameras 100-1 and 100-2 respectively yields 1280·720·10·400, or more than 3 billion SSD calculations per frame of optical image. For a handheld device 10, the range of depth would more like a few mm to about 900 mm, but producing a cloud of three-dimensional data even for reduced range would still represent a substantially huge number of calculations. Performing such large computation in real-time would require substantial processing overhead including operating power, and would yield latency, to the detriment of device 10 response time. Consequently the realism of recognizing gestures made in the hover zone associated with device 10 and causing a remote appliance to respond accordingly would suffer due to a perceive lack of spontaneity.

Embodiments of the present invention avoid having to cope with such large amounts of data by intelligently identifying a relatively few so-called relevant landmark points in two-dimensional camera-acquired image data. Three-dimensional reconstruction of locations of these relatively few points is undertaken, with no reconstruction being taken for all data points. The culling out of unnecessary data points reduces three-dimensional reconstruction very substantially, eliminating perhaps 99.9% of the data points. Preferably application of justified epipolar geometry and image rectification techniques during signal processing substantially reduce time and latency needed to arrive at a final, very sparse, set of landmark points used to identify user gestures.

It is useful to provide an overall view of the methods carried out by algorithm(s), according to embodiments the present invention. Efficient operation of the present invention is promoted by balancing the processing load of software algorithm execution within device 10, acquisition system 40, system processor 45 and auxiliary processor(s) 45'. Such load balancing is a function of the processor architecture associated with the grid of cameras 100-1, 100-2, etc. Otherwise, most of the processing will be carried out in device 10 with processor system 45 and externally disposed auxiliary processor system(s) 45'. Referring briefly to FIG. 7, external processor system(s) 45' may include the same functional components as in-device processor module 240, and can be functionally coupled to I/O transceiver(s) 48'. If processing is done within device 10 with processor module 240, overhead associated with this processing should not exceed about 10% to about 15% of processor utilization. So doing would reduce run-time computation load for device 10 and helps ensure a desired frame rate of at least 30 frames/sec for acquisition system 40. Thus, parallel processing steps can execute within processor system(s) 45, 45'. In practice, system 45' may process data from multiple devices 10 (see FIG. 1) and therefore should be able to acquire and correctly process image data from each such device. Thus it is understood that system 45' (see FIG. 7) preferably includes relevant task partitioning and communication logic functionality. The software algorithms preferably used by embodiments of the present invention will now be described generally at a logical level and with reference to some of the many opportunities for potential parallelism of algorithm steps (or blocks).

The present invention seeks to rapidly extract a relatively few relevant (x,y,z) landmark points from (x,y) data obtained by acquisition system 40, without having to extract a lot of unnecessary (x,y,z) data. Typically less than one-hundred and preferably a dozen or so (x,y,z) landmark points suffice, and the time-consuming and error-prone task of removing background information from all acquired imagery need not be undertaken. This is to be contrasted with the prior art's necessity to process many, many hundreds of thousands of image points. According to the present invention, two-dimensional image recognition is carried out on the acquired (x,y) image data to locate landmarks associated with the imaged object(s) in so-called image coordinates. These coordinates can be pixel or sub-pixel $p_{(x,y)}$ addresses in each camera's sensor array 170 for objects of interest, e.g., fingertips, hand centroid, medial axis of fingers, etc. Processing system software preferably labels each landmark using an identification rule. Each camera's a priori determined and stored lens distortion and other camera intrinsic parameters are used to find the undistorted image coordinates of the landmarks on a per camera basis. A likelihood priority order of the correspondence between the landmarks across different cameras is then employed, e.g., a given index fingertip acquired in this image from camera 100-1 is most likely the same as the index fingertip in the other image acquired by camera 100-2, etc. Advantageous use of so-called epipolar scan lines and image rectification assists in rapidly disambiguating potential landmark points, to quickly find the best matches.

Using the stored calibration information, the (x,y,z) coordinates for each landmark are determined with respect to coordinates of each camera, subject to a scale factor. The scale factor represents the assumption that the real-world position of a landmark in image coordinates (i.e. a pixel or sub-pixel address) is along a given light ray associated with that pixel or sub-pixel, subject to some error in the image analysis and calibration process. If camera calibration information has not been provided by the camera manufacturer, such information will be generated and stored by the manufacturer of device 10. Light rays are depicted in FIGS. 1-4 as spoke-like lines emanating outward from each camera to define the relevant FOV. FIG. 5A depicts for a generic two-dimensional camera such as 100-1 the relationship between an object 20 (or L), a light ray (drawn in bold) from the object, passing through camera lenses 150', 150, to image plane 170, and a the camera's virtual image plane 170'. The (x,y,z) camera coordinates of each landmark are converted to $(x_w, y_w, z_w)$ common world coordinates, using previously determined and stored device 10 extrinsic parameters.

Next, three-dimensional reconstruction of corresponding landmarks across the cameras is carried out using at least one minimization algorithm. Essentially, the task is to find the three-dimensional intersection of at least two rays in three dimensions. The first of the two rays is from a landmark point to the pixel sensor on camera 100-1, and the second ray is from the same landmark point (but as viewed from the second view point) to the pixel sensor on camera 100-2. In practice various error factors cause the two rays to come very close to each other near the landmark point, but not intersect perfectly mathematically. Accordingly, embodiments of the present invention use a minimization algorithm to find the midpoint of two closest points in the two rays corresponding to the same (or substantially nearly the same) landmark.

Note that advantageously such reconstructions involve a relatively few landmark points, typically less than 1% of what must be processed from the very large three-dimensional cloud data set acquired by prior art structured light systems, TOF systems, full stereo processing systems, and the like. In the present invention, correspondences of unlikely pairs are cleaned-up preferably based on heuristics or information from the past correspondences or tracking predictions, e.g., using a common filter based upon probabilities, perhaps using known Markov prediction or Bayesian networks methods. The algorithm then preferably performs smoothing and tracking in the world coordinates, and user interface events are produced with location information with respect to $(x_w, y_w, z_w)$ common world coordinates. By way of example, these events can be transmitted by device 10 or by remote processing system(s) 45' to appliances, e.g., smart appliance 30, perhaps to dynamically alter at least some images rendered on the appliance display, responsive to user gestures interpreted by device 10.

Referring still to FIG. 4 and FIG. 5A, successful operation of device 10 is promoted by knowing or obtaining intrinsic (or geometric) parameters, extrinsic device parameters, and camera registration with respect to one another, and with respect to device 10. In practice this information is acquired during one or more calibration steps. Initially the intrinsic or geometric parameters of each camera, e.g., 100-1, will have been determined, including camera lens focal length, horizontal and vertical pitch of pixels $p_{(x,y)}$ in array 170, FOV-H, FOV-V, and optical distortion parameters $k_j$.

For purposes of intrinsic calibration, embodiments of the present invention consider that each camera is equivalent to a ray-based optic device that projects rays of incoming light via the camera lens 150, 150' to pixels on its sensor array 170. As noted the three-dimensional cone of such rays define the camera FOV Intrinsic calibration determines correct mapping between the rays and pixels in the sensor array for each camera. Once the camera is calibrated, the forward projection from a ray of light to a pixel in the sensor array, and a backward projection from a pixel to the ray of light are known. After the cameras are fixedly mounted to device 10, extrinsic system calibration determines each camera's extrinsic properties. These extrinsic properties include the two-dimensional pixel coordinates $p_{(x,y)}$ of each camera's sensor array 170, with respect to the outside world. These extrinsic properties further include each camera's rotation and translation matrices, respectively R and T, with respect to the $(x_w, y_w, z_w)$ external world common coordinate system associated with device 10 (see FIG. 5A). Such a priori knowledge of the collective geometric properties of the cameras 100-1, 100-2, etc. and device 10 can be used to locate landmark positions for user objects 20 in three-dimensional hover zone 50.

Many calibration methods are known in the art, e.g., "Flexible Camera Calibration by Viewing a Plan from Unknown Orientations", Zhengyou Zhang, Microsoft Research, Redmond, Wash. 98052. Preferably calibration does not require knowledge of the camera orientation, and starts by defining a camera reference system that need not be accessible external to the camera. That is, one cannot readily measure location of a real world object with respect to that reference coordinates until calibration is completed and the camera is registered to an external world coordinates. Such approach is a convenient mathematical concept to derive camera calibration parameters.

What can be determined is the (sub) pixel location of an external landmark (like a corner of a checkerboard) in the camera pixel sensor image plane 170 (see FIG. 4, FIGS. 5A-5C). Accordingly, patterns that preferably are on a common plane are imaged during calibration, and have landmarks that are well defined with respect to each other. Such calibration involves first defining a visible pattern on a plane surface, e.g., a repeated checkerboard pattern. Next the locations of pattern landmarks (e.g., corner points on the checkerboard) are measured precisely with respect to a known position on the pattern. The pattern is maintained steadily to fill the camera's FOV, and an image is captured by the camera. Corner milestones in the pattern are identified with sub-pixel resolution in the camera pixel sensor image plane. Calibration precision is enhanced by repeating this measurement several times, with different pattern images. Correspondences between the landmarks and their respective (sub)pixel locations in the image plane are input to a cost-minimizing calibration algorithm within processor system 45, whose processed output includes the set of intrinsic parameters for the camera, preferably stored, e.g., within camera memory 200.

Calibrating camera intrinsic and extrinsic properties is typically done once in the lifetime of the camera. Acquired calibration data should be valid for the life of the camera absent significant positional shifts inside the camera, between mounted cameras relative to each other and to device 10. One might, however, develop procedures to regenerate such data after the camera has been mass produced. But in practice, gathering and storing the various calibration information is preferably done during manufacture of the cameras and/or device 10. So doing further conserves processing power of device 10, as does processing with the cameras of time-invariant calculations. Calibration precision is a function of how well calibration mapping can be estimated, and the quality of calibration should be commensurate with the precision requirements of the application. For example, recognition of gestural interfaces does not require the mm or sub-mm metrology demanded by touch screen specifications.

Various compression methods may be used for cameras having higher pixel density sensor arrays 170. One can use MPEG or some other form of image compression to substantially reduce data size and associated required bandwidth, but with an associated cost and complexity penalty of requiring an MPEG coder and decoder. Thus, embodiments of the present invention may use a semantic compression that transmits only segments of the acquired image that are of interest for the relevant application. A semantic compression is one that understands the image, e.g., if the object is known to be a hand, the processor can reduce the data to be transferred to only those pixel addresses representing a few fingertip points, or other key landmarks for a gesture application. In an extreme case, it can suffice to transmit only the relatively sparse data representing location (i.e., relevant $p_{(x,y)}$ pixel row/col addresses in sensor pixel array 170, FIG. 4) of one or more pixels that represent the tip of a single (or multiple) pointer object(s). In other words, some form of image segmentation logic in the camera module can substantially reduce the amount of transmitted data because only data from camera array pixels containing interesting scene regions, e.g., landmark data or edges, need be transferred. In another aggressive compression model, the processor may reduce the volume of data transfer to host by reducing the image to a few pixels representing a few landmark points, perhaps the contour of a user's hand, and their properties, or even perform some rudimentary gesture processing, and send the results of the host. An example of a relatively few landmark points might be fingertip points relating to the tip of at least one user finger or other object, used in a gesture application.

Segmentation involves labeling pixels that are part of the acquired image foreground and presumably the user of interest, which is to say that segmentation seeks to find these key parts in the camera-acquired images. For instance, for a user hand object, segmentation labels pixels that are part of the hand and wrist, palm and fingers. If two hands are imaged, segmentation can identify up to ten finger parts, e.g., landmarks, and the result of the segmentation process from each camera is thus an image that has unique labels for each finger, palm and wrist, e.g., an image of the relevant landmarks A, B, C, D, E, F in FIG. 2A. Such image of the relevant landmarks can be represented more compactly and thus require less bandwidth and less memory storage than if the entire frame of acquired imagery were processed and stored. The segmentation algorithm can run in parallel for the image acquired by each camera, and if the camera includes a processor, e.g., 180 in FIG. 4, each such processor can perform segmentation on each image. Alternatively, a central processor, e.g., within processor 240 in processor system 110, see FIG. 7, can schedule parallel threads to perform the multiple segmentation tasks simultaneously. Segmentation and use of probable landmarks before the three-dimensional data is reconstructed further enable implementation of device 10 using inexpensive, generic components, unlike many prior art approaches.

Image segmentation algorithms are known in the art. Some algorithms make assumptions as to object shapes, e.g., a finger is a cylinder that begins with a tip and ends when it joins a wider body of pixels representing the palm of the hand object. If the cameras acquire color information, the algorithm can use color features to assist in segmentation. Other algorithms store hand model data, and then try to match a camera-acquired image of an object to see which stored model provides the best object match. If the model matching is reasonable acceptable, other image parts can be readily determined since they are already identified in the model. From the perspective of a single camera 100-1, a finger object 20 can be occluded by the other fingers, yet still be visible to another camera 100-2 because of the differing vantage point. Thus in many instances occlusion difficulties can be overcome because of the multi-camera approach used in the present invention. While true three-dimensional reconstruction will not occur for the occluded object, nonetheless if it is imaged by the second camera its presence and its position relative to the first, non-occluded, object may be inferred.

It is useful to consider FIG. 5A, which depicts concepts used in defining a global system of coordinates, according to embodiments of the present invention, although an intuitively identifiable coordinate system is not necessary for implementing all types of natural interface applications. However a global system coordinate system is useful and can be defined with respect to a known world point (e.g., a known location on device 10).

Let $$\begin{pmatrix} u_d \\ v_d \end{pmatrix}$$

be the pixel coordinate of a landmark on a user 60 as observed in hover zone 50 by at least two cameras, e.g., 100-1, 100-2. For ease of understanding, FIG. 5A depicts a user or user object 20 at location L, an optional filter 160' intermediate the object 20 and camera lens 150, and also shows the camera sensor array 170 of pixels $p_{(x,y)}$. Lens 150 will be equidistant between array 170 and a virtual image plane 170', drawn with phantom lines. A single ray (of many rays) within the FOV of the camera sensor array and lens is drawn with a bold line (for ease of understanding) terminating at point L, object 20. It is understood that FIGS. 2A-3 depict a plurality of converging rays, of which the ray in FIG. 5A is but one such ray Each camera, e.g., 100-1, will image the landmark in different (sub) pixels of its array 170, depending on its vantage point with respect to the user object of interest. The present invention seeks to find the most likely correspondences between the landmarks. Use of camera calibration and global registration information enables calculating rays emanating from each camera that pass through L. Clearly, the intersection of the rays from at least two cameras defines the location of L in three-dimensional space in the active area. However, in a real (non-ideal) system, the rays do not intersect due to slight offsets resulting from calibration error, the error introduced due to the vantage point of each camera, quantization and detection errors, etc. Nonetheless, a solution can be found that minimizes a cost function (in this case, the distance between multiple lines) and produces an estimated three-dimensional point that is close to theoretical intersection point. Such techniques are described by Hartley and Zissermann "Multiple View Geometry in Computer Vision", second edition, Cambridge University Press, March 2004.

Let $$\begin{pmatrix} x_d \\ x_d \end{pmatrix}$$

be the image coordinate of the landmark, let $$\begin{pmatrix} u_n \\ v_n \end{pmatrix}$$

be the undistorted pixel coordinate of the landmark, and let $$\begin{pmatrix} x_n \\ y_n \end{pmatrix}$$

be the undistorted image coordinate of the landmark.

The relationship between $$\begin{pmatrix} u_d \\ v_d \end{pmatrix}$$

and $$\begin{pmatrix} x_d \\ x_d \end{pmatrix}$$

is obtained from:

$$u_d = u_0 + \alpha x_d + c y_d$$

$$v_d = v_0 + \beta y_d$$

where $\alpha$ and $\beta$ are scale factors of the camera sensor (i.e., pixel dimensions), and c is the camera pixel array skewness, where in an ideal sensor, $\alpha=\beta$ and c=0. The parameters $u_0$ and $v_0$ are the center of the image, and parameters $\alpha$, $\beta$, c, $u_0$ and $v_0$ are obtained from the calibration step of each camera.

Cameras 100-1, 100-2 as used in the present invention device 10 have relatively large FOVs, and consequently distortion effects cannot be ignored. For metrology applications such as touch measurement or certain computer vision detection algorithms, lens distortion must be corrected. Camera lens distortion has a dominant radial factor and a less dominant tangential factor. The more dominant radial distortion may be modeled as follows:

$$x_d = x_n + x_n [k_1 r_n^2 + k_2 r_n^4 + \ldots ]$$

$$y_d = y_n + y_n [k_1 r_n^2 + k_2 r_n^4 + \ldots ]$$

where $r_n^2 = x_n^2 + y_n^2$

Parameters $k_1, k_2, \ldots$ are lens distortion parameters and are estimated from the calibration step for each camera module. The solution method for $$\begin{pmatrix} x_n \\ x_n \end{pmatrix}$$

may include iterative or other numerical methods that are available in the literature.

Let $$\begin{Bmatrix} X_c \\ Y_c \\ Z_c \end{Bmatrix}$$

be the coordinate of a landmark in the camera coordinate. Let $$\begin{Bmatrix} X_w \\ Y_w \\ Z_w \end{Bmatrix}$$

be the coordinate of the landmark in world coordinates.

FIG. 5A depicts camera coordinates $(x_c, y_c, z_c)$ and world coordinates $(x_w, y_w, z_w)$ for a single camera, e.g., 100-1. Similarly, each other camera has its own camera coordinates but shares the same world coordinates, which are not shown in FIG. 5A.

From the camera model one has:

$$X_c = \frac{Z_c}{f} \times x_n$$

$$Y_c = \frac{Z_c}{f} \times y_n$$

In other words, $$\begin{pmatrix} x_n \\ x_n \end{pmatrix}$$

is the projection or a landmark point $$L = \begin{Bmatrix} X_c \\ Y_c \\ Z_c \end{Bmatrix}$$

in the image plane after unwrapping the effect of distortion. Of course, many points along the ray that passes through L are also projected to the same image point $$\begin{pmatrix} x_n \\ x_n \end{pmatrix}.$$

Resolving this particular landmark in three-dimensional speed requires information about the same (or nearby) point, from the other camera(s). But before one can use the additional information, it is necessary to calculate coordinates of L in a common world coordinates because camera coordinates do not present accessible reference information to the application. Let the $$L = \begin{Bmatrix} X_w \\ Y_w \\ Z_w \end{Bmatrix}$$

be the coordinate of point L in a common world coordinate.

The transformation from camera to world coordinates is given by:

$$\begin{Bmatrix} X_w \\ Y_w \\ Z_w \end{Bmatrix} = R \begin{Bmatrix} X_c \\ Y_c \\ Z_c \end{Bmatrix} + T$$

where $R(3\times3)$ and $T(3\times1)$ are rotation and transformation matrices, respectively. The extrinsic parameters R and T are obtained during camera calibration when cameras are registered to the same common global coordinate system.

The issue of correspondence must also be addressed. When a real world object, e.g., user object 20, is imaged substantially simultaneously by multiple optically similar cameras, e.g., 100-1, 100-2, etc., different parts of the same object map to different camera array pixels depending upon relative orientation and distance of the cameras with respect to each other. Solving the image correspondence means determining where the same object is mapped in two or more images from the same camera (during user object motion) or from different cameras. Determining object correspondences is important to correctly determine the three-dimensional position of an object using the geometrical properties of a camera grid. It is well-known in the art that unless correspondence is established correctly, three-dimensional reconstruction can produce ambiguous results. According to embodiments of the present invention, camera calibration information and information from landmark identifiers is used to disambiguate the correspondence problem.

Even if the same object is being imaged by all cameras, the fact that they view the same object from different vantage points and from different distances, the image imprint of the object in each camera can be very different. For instance, a user finger can fill the frame of a nearby camera but only occupy a small part of the frame of a distant camera. However when the user object is a comfortable distance from each camera, occlusion difficulties are lessened and substantial benefits can be obtained from the multiple views that are obtained to recognize landmark(s). If the user object is very far from the cameras, occlusion problems are less of an issue.

In preferred embodiments, cameras 100-1, 100-2, etc. will have been calibrated (and preferably calibration data stored in the camera's internal memory 200, see FIG. 4) and modeled to have pinhole camera characteristics. Such characteristics enable epipolar geometric analysis, which facilitates more rapid disambiguation among potential landmark points during three-dimensional reconstruction. Preferably image rectification is used to make epipolar lines parallel to an axis of the camera image planes, to better facilitate finding correspondence between landmark image points acquired by the two cameras. As will be described herein with respect to FIGS. 5B-5G, software within the device processor system looks at epipolar lines drawn through landmark points in the first image plane to find candidate landmark points on or adjacent the epipolar line in the second image plane. Preferably only such candidate landmark points are deemed disambiguated and receive three-dimensional processing; the large number of other points are simply discarded without further processing. Consequently processing overhead is substantially reduced, as is latency time. The reduction in three-dimensional processing is rapidly reduced by greater than 99%, and frequently greater than 99.99%, thanks in part to application of epipolar geometry and image rectification.

Figure 5B:
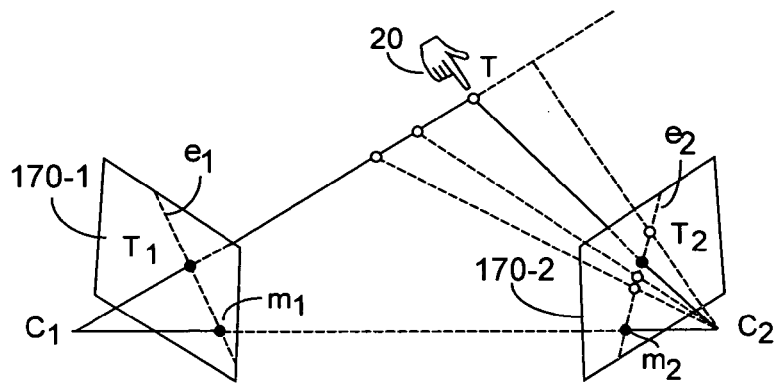
Figure 5C:
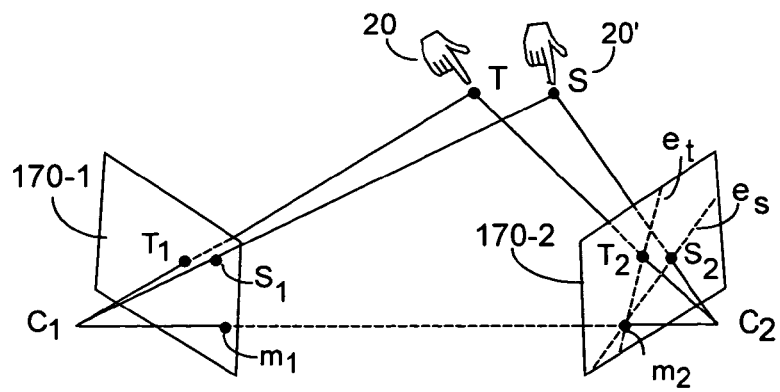

FIG. 5B and FIG. 5C depict the application of epipolar line geometric properties of device 10 and cameras 100-1, 100-2, according to embodiments of the present invention. These embodiments promote low processing requirements and improve latency times by recognizing and taking advantage of these epipolar properties to enhance disambiguation between multiple potential object landmarks during three-dimensional reconstruction. Epipolar geometry is typically defined by assuming a pinhole camera model. Cameras 100-1, 100-2 preferably are calibrated and registered with respect to each other.

Registration maps the lens coordinate system of cameras 100-1, 100-2, etc. to a common coordinate system, e.g., a corner of the display monitor, the center of the baseline separating the two cameras, etc. The associated calibration information enables each camera to be converted operationally so as to satisfy the characteristics of a pinhole camera. So doing entails determining the distortion model for cameras 100-1, 100-2, un-distorting camera-acquired images, and then finding camera intrinsic parameter values. Of course if camera(s) 100-1, 100-2 have exceedingly good lenses, distortion may be nil, in which case un-distorting method steps may be dispensed with. This information is saved, e.g., in memory 240 (see FIG. 7), for use during device 10 run-time operation. Once cameras 100-1, 100-2 can be modeled as pinhole cameras and registered to each other, the properties of epipolar geometry can be advantageously employed to reduce processing search time to find landmarks (e.g., A, B, C, D, etc., see FIG. 2A) acquired by a multi-camera remote control device 10.

For a gesture object, the present invention seeks to recognize the user gesture and certain other gesture properties that are useful to implement a natural gesture-based user interface. The field of gesture recognition is a well-studied topic in the art, and aspects of the present invention provide a platform to implement gesture recognition algorithms. An exemplary result of a gesture recognition algorithm (e.g., 230, FIG. 7) is a series of landmark points, e.g., fingertips, digits, palm centroid, wrist centroid, that define the configuration of the gestures. In FIGS. 2A-4, exemplary landmarks are denoted as circles on the display-facing surface of the user, e.g., A, B, C, D, E, etc. Cameras 100-1, 100-2 capture images of the user within hover zone 50, and the landmarks are identified by their (x,y) pixel locations in the image plane of each camera. Just as with a finger, not all landmarks of a given gesture can be visible to all cameras. However, through aggregating this information and establishing correspondence between them across all the cameras a very well picture of the user intention can be deduced. Understandably, generating landmark information using processor 180 within each camera 100-1, 100-2, etc. (see FIG. 4) and transmitting only those relatively few data points can substantially reduce throughput of data to be communicated across the grid of camera. In-camera processing of image data can reduce the magnitude of data needed to represent landmark data from hundreds of kilobytes, to a few hundred bytes or less.

Three-dimensional reconstruction of landmarks including resolving a particular landmark in three-dimensional space requires information about the same (or nearby) point from multiple cameras. Acquiring multiple views of a user object can be advantageous in dealing with problems of occlusion. Occlusion occurs when a segment of the object of interest becomes hidden behind another object from the vantage point of one or more cameras. If the object is hidden from both cameras, only higher level reasoning like the tracking over a number of frames can deduce the location of the object while it is hidden from both cameras. However, when a segment of an object of interest is hidden from only one camera, the image captured by the other camera can assist in producing useful information about the occluded area. In such instance, the system looks at the neighboring area that is visible to both cameras. This capability of multi-camera systems is very advantageous compared to what little can be done by prior art systems using a single view active light capture.

Event generation will now be described. Event generation is a function of system software that translates the user's visual natural interface actions to commands for the host system. This is not unlike events created by a modern operating system for applications, responsive to mouse and pen movements. In the present invention, gestural user interface events include identifying code and set parameters. The parameters provide additional information about the event, such as (x,y,z) coordinates of landmarks on the user, object orientation, size, etc. This information is obtained through the image analysis and three-dimensional reconstruction capabilities provided by the present invention.

During remote control device 10 runtime, the calibration and registration information can be used for many purposes. Once the grid of cameras 100-1, 100-2, etc. are registered to a common global system, information from the multiple cameras can be correlated. For instance, a landmark, perhaps forefinger tip C in FIGS. 2A-3, imaged by camera 100-1 can be said to lie in an epipolar line from another camera, 100-2. Alternatively, if the landmark, here C, for an object 20' is detected in the image planes of at least two cameras, e.g., 100-1, 100-2, the corresponding backward projection rays can be intersected to determine the three-dimensional position of the landmark in the global world coordinate system (see FIG. 5A).

Referring to FIG. 5B, let $C_1$ and $C_2$ denote the center of optical projection for cameras 100-1, 100-2 respectively, where user fingertip 20 is a potential object landmark. Cameras 100-1, 100-2 each image user fingertip 20 from their respective spaced-apart positions. The fingertip object projects onto image plane 170-1 (of camera 100-1) at location $T_1$, and projects onto image plane 170-2 (of camera 100-2) at location $T_2$. The intersection of light rays $T_1$, T and $T_2$, T defines the (x,y,z) location of T in three-dimensional real space. The intersection of line $C_1$-$C_2$ with image plane 170-1 is denoted and the intersection of line $C_1$-$C_2$ with image plane 170-2 is denoted $m_2$. $C_1$, $C_2$, and T define a plane that intersects with image plane 170-1 to define an epipolar line $e_1$. The projection of any point in light ray $T_1$-T maps to point T1 in image plane 170-1. The same plane defined by points $C_1$, $C_2$, and T intersects with image plane 170-2 to define an epipolar line $e_2$. The projection of any point in light ray $T_1$-T maps to epipolar line $e_2$.

This observation is significant because finding the image of any candidate point along ray $T_1$-T can be simplified to looking for candidate points along epipolar line $e_2$, rather than searching the entire image for candidate points. At this juncture, at step 440 in FIG. 9 a limited number of potential three-dimensional candidate landmark points under consideration, perhaps on the order of 100 points from one image plane and perhaps 150 points from the other image plane. Perhaps 80 of these 250 points are found on both image planes. Identifying corresponding points could be carried out by a time-consuming process of comparing every candidate point from one image plane to every candidate point on the other image plane, a calculation involving perhaps 100·150 or 15,000 steps for the example given. More preferably, the present invention recognizes that from the 100 candidate points in the first image plane, 100 epipolar lines can be defined and projected onto the second image plane. According to embodiments of the present invention it suffices to simply look for corresponding candidate points on the second image plane that lie upon these epipolar lines, disregarding candidate points on the second image plane that lie elsewhere. In practice one can define "fat" epipolar lines to account for tolerances associated with camera calibration, e.g., relevant candidate points in the second image plane might occur very close to rather than directly on theoretical epipolar lines from points in the first image plane.

FIG. 5C is similar to FIG. 5B, and demonstrates application of epipolar constructs, especially to disambiguate between multiple landmark user objects 60 (T), 60' (S). Camera 100-1 images fingertip objects 20, 20', which appear at positions $T_1$, $S_1$ on associated camera image plan 170-1. Substantially simultaneously, camera 100-2 images the same two user objects, which appear at positions $T_2$, $S_2$ on associated camera image plan 170-2. Referring to image plane 170-1 (associated with camera 100-1), the two images landmarks $T_t$ and $S_1$ preferably are identified using image analysis algorithm(s) 235 as described herein with respect to FIG. 7. Let us assume that shape analysis is not conclusive, which implies uncertainty as to whether $T_2$ or $S_2$ are images of point T in plane 170-2. According to embodiments of the present invention, disambiguation between $T_2$ and $S_2$ involves defining an epipolar line $e_t$ in image plane 170-2, and determining whether $T_2$ or $S_2$ lie upon this line. Per FIG. 5C, $T_2$ lies upon epipolar line $e_t$ and $S_2$ does not. Thus one can rapidly conclude that $T_2$ corresponds to $T_t$ and both represent object 20, to the exclusion of potential candidate $S_2$. Once this correct correspondence is established, the present invention can determine the three-dimensional (x,y,z) coordinate position for object 20 (T).

Note in FIGS. 5B and 5C that the epipolar lines were at arbitrary angles with respect to axes of the image planes. Traversing these lines to resolve correspondences is complicated and costly. Traversing would be simplified if the images were rectified such that such a pair of corresponding epipolar lines became collinear and parallel to each other alone one of the image axes. Image rectification methods are known in the art, e.g., see "*Introductory Techniques for* 3*D Computer Vision*" by E. Trucco and A. Verri, 1998.

FIG. 5D and FIG. 5E depicts two user hand objects that each has at least one projecting finger. In FIG. 5D, the hand and finger images were captured by left camera 100-1 (see FIG. 7), and the forefingers are denoted 20'-L and 20-L. The images in FIG. 5E were captured by right camera 100-2 (see FIG. 7), and the forefingers are denoted 20'-R and 20-R. FIG. 5F and FIG. 5G represents the rectified images, respectively, of FIG. 5D and FIG. 5E. Note that the captured images differ somewhat, which is not unusual given that each camera captures images from its own unique viewpoint.

In the rectified images depicted in FIGS. 5F and 5G, the epipolar lines are collinear and parallel to the horizontal image plane axes. Transformation parameters used to rectify the images preferably are obtained from the intrinsic and extrinsic parameters for the cameras, which are obtained generally during factory calibration of the cameras.

Thus epipolar lines, e.g., $ep_1$, $ep_2$, $ep_3$, etc. are shown horizontally, parallel to display monitor scan lines in FIG. 5F and FIG. 5G. Looking at image point 20-L (acquired by camera 100-1) in FIG. 5F, it is easy to discern that correspondence exists with point 20-R but not with point 20'-R (acquired by camera 100-2) in FIG. 5G. This is because epipolar line $ep_1$, passing through point 20-L, also passes through point 20-R. Furthermore, there is less chance of erroneously establishing correspondence between fingertip 20-L and fingertip 20'-R because 20'-R lies on a different epipolar line, $ep_2$. Rectified images in FIGS. 5F and 5G may be reduced at their edges as shown by boundaries 195L and 195R because not all image segments acquired by left camera 100-1 have a corresponding image segments acquired by right camera 100-2. The images can be constrained to lie within a rectified rectangular image boundary of one camera by defining bounding rectangle 197-L and 197-R.

Thus, one aspect of the present invention recognizes that cameras 100-1, 100-2, etc. can be modeled as pinhole cameras. Such pinhole camera modeling warrants application of epipolar geometric analysis and image rectification to camera acquired data. Such analysis enables system image processing computation and recognition of landmark points to occur very rapidly and reliably, using relatively inexpensive components. Further such analysis is one of the factors contributing to reduction of overall system latency times.

FIGS. 6A-6K depict latency, as improved by embodiments of the present invention. In a natural user interface application excessive processing latency can produce an unnaturally long time lag between the user's gesture or other interaction, and the time when a meaningful response is displayed on the system monitor or is otherwise manifested. In these figures, vertical tic marks along the horizontal line represent units of time on the order of perhaps 33.3 ms, e.g., exemplary time required to acquire a frame of data from the system cameras. It is assumed in these figures that similar tasks takes approximately similar times to carry out, and that transmission delays are subsumed in each block or epoch of time.

FIGS. 6A-6D show the true location position of a hand object as a function of time. Thus the hand object is shown moving at equally per unit time interval (e.g., constant speed) and is shown on a system two-dimensional monitor display with zero latency. In FIGS. 6A-6K, the actual location of the hand object is drawn with bold line, to distinguish from other representations of the hand object. FIGS. 6E-6H show the approximate length of time required by prior art algorithm methods to carry out given tasks, in terms of acquiring imagery, creating a three-dimensional data cloud, carrying out steps during detection middleware, and ultimately displaying the location of the detected hand on a system monitor display. Thus, in FIGS. 6E-6H, a unit time corresponds roughly to carrying out each of these prior art processing steps.

FIG. 6E represents raw data capture, according to the prior art, a step that may involve multiple sub-captures, leading to a series of raw data used later to build a three-dimensional map of the imaged scene. Note that this prior art step shown in FIG. 6E does not produce three-dimensional data, but merely captures raw data that must be processed in the following step to produce a three-dimensional cloud. Assume then that this capture of raw data obtains an image of the hand object when the hand object is at the first time tic mark (see FIG. 6A). FIG. 6F represents creation of a data cloud per the prior art, a task depicted as requiring about one unit of time, during which time interval the hand object has moved to the second time tic mark (see FIG. 6B). In FIG. 6G the three-dimensional data cloud has been passed to prior art detection middleware software. This software carries out image processing of depth data to identify the hand object, and presumably also to find the fingertip. During this time, the hand object has actually moved to the third time tic mark.

In FIG. 6H, the prior art processing pipeline displays the hand object, but at the first tic mark location where it was when the raw data was captured (see FIG. 6E). The time difference between the current true location of the hand object (fourth time tic mark) and what is produced and displayed from the processing pipeline (first time tic mark) is a measure of the latency of this prior art method. In this example the latency is three time units. If each time unit is say 33.3 ms, then the latency or time lag here is about 100 ms.

Referring now to FIGS. 6I-6J, a similar progression of events is depicted for embodiments of the present invention. FIG. 6I depicts substantially simultaneous image capture by cameras 100-1, 100-2, see FIG. 9, step 400. As such, image capture does not contribute to latency for remote control d. FIG. 6J represents middleware image processing (see FIG. 9, step 410 to step 470), identification of a relatively few key landmark points, and rapid three-dimensional reconstruction location of only those key landmark points. Three dimensional reconstruction is quite fast as only a dozen to perhaps one hundred points require reconstruction. During this time interval the hand object has moved to the third time tic mark (shown by the bold line hand, and by FIG. 6C). Assuming a similar time required to display the image (first time tic mark) as required in the prior art, latency is seen to be two time units, or perhaps 66.6 ms, for the assumed frame rate. Thus, latency in embodiments of the present invention is at least about 33.3% better than in the prior art methods exemplified by FIG. 6H. Thus, not only do embodiments of the present invention employ inexpensive, small, lightweight generic cameras 100-1, 100-2, but also achieve faster throughput time. The low latency achieved by the present inventions achieves a more realistic natural user interface experience.

Figure 7:
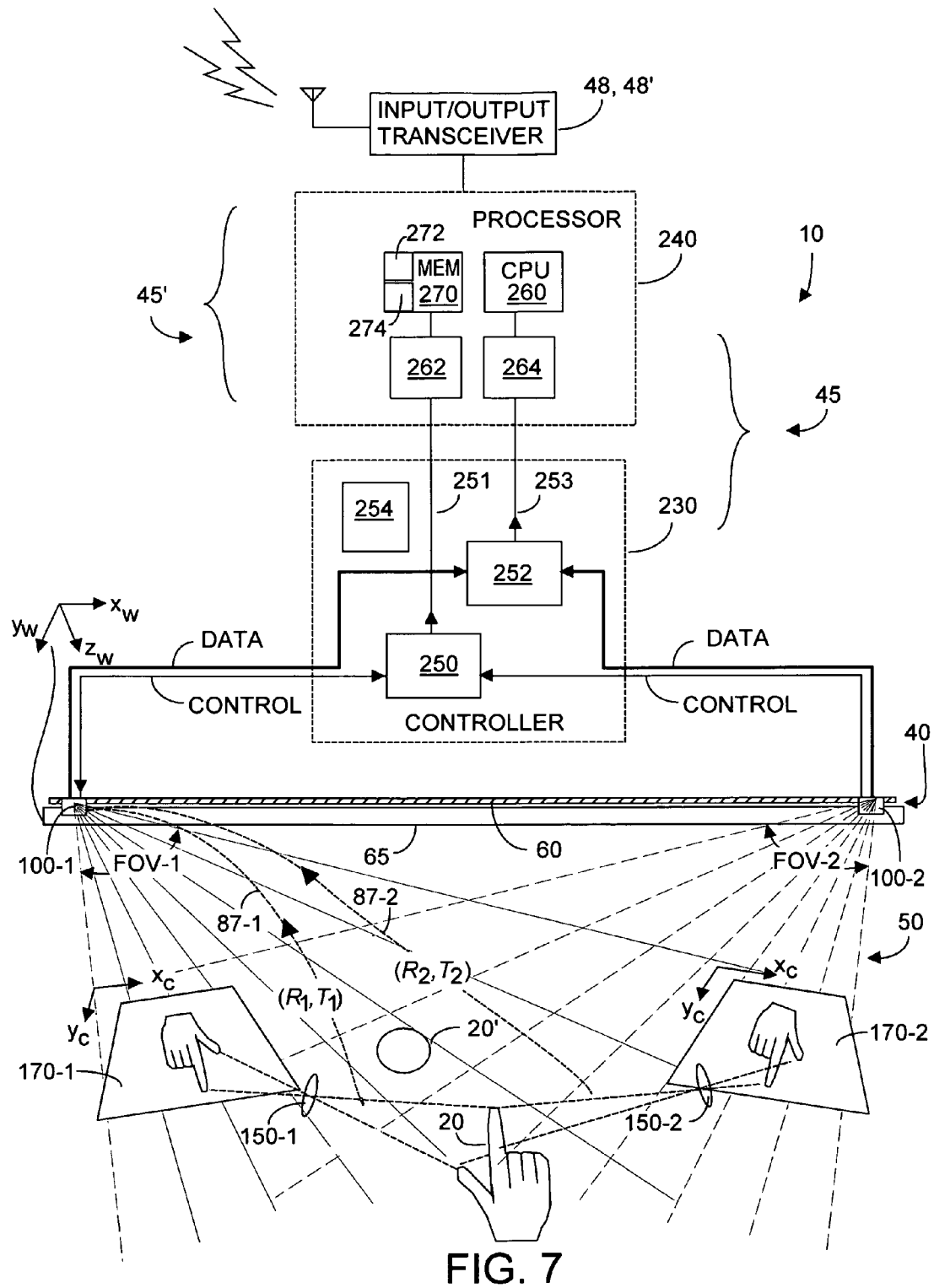
FIG. 7 is a block diagram of a handheld remote control device, according to embodiments of the present invention.

As shown in FIG. 7, embodiments of the present invention include an internally disposed signal processor system 45 that includes a controller system or module 230 and a processor system or module 240. Controller module 230 communicates with each camera 100-1, 100-2, etc. in the grid of cameras through a communications channel that preferably includes a pair of interface lines, a DATA line and a CONTROL LINE, and a ground line. The DATA line, drawn in bold, is used to transfer frames of camera-acquired images substantially synchronously from the various cameras 100-1, 100-2, etc. The CONTROL LINE is used to send/receive commands, synchronization signals, and queries to/from the cameras. Operation of each camera in the grid of cameras is under control of processor system 45 in device 10. Preferably, controller module 230 further includes logic circuitry 250 and 252, and performs tasks related to aggregation of data, and to facilitating synchronization of the cameras. Preferably the cameras acquire their images substantially simultaneously, which in practice means camera exposures are synchronized to each other within about ±1.5 ms. Controller system 230 further includes memory, e.g., flash memory 254, to preserve configuration data for each camera, including calibration data describing geometric properties, i.e., intrinsic and extrinsic parameters, for each camera.

Processor system module 240 includes a CPU processor module 260, driver modules 262, 264, and memory 230 preferably storing software algorithm routines 262, 264. Driver modules 262, 264 provide software interface for the DATA and CONTROL lines. Without limitation, driver module 262 may be a USB driver that manages the collection of camera image frames at a preprogrammed frame rate as set by software algorithm module 240, stored in memory 270. Algorithm module 272 preferably is a software component that uses the data frames collected by cameras 100-1, 100-2 to perform image processing as needed. Thus, algorithm module 272 performs such three-dimensional reconstruction of landmarks identified on object(s), e.g., 20, under control of CPU 260. Processor system 240 further includes a transmitter or transceiver module 280 that wirelessly couples or transmits processed data as application events or the like to at least one appliance 30, 30', 30'', etc. as shown in FIGS. 1. 2A, and 3. Depending upon the appliance, the appliance can then command appropriate movement of displayed images, e.g., tennis ball 80 on appliance 30 in FIG. 1, or issue commands to cause light appliance 30' to alter state by dimming, turning on, turning off, etc., or issue commands to lock or unlock a door appliance 30'', etc. Such commands and displayed movements are in response to user gestures and natural interface movements detected by handheld device 10 and remotely coupled to an appropriate appliance.

At the bottom portion of FIG. 7, phantom lines represent light rays from points on the user object 20 to image points on the image planes, which light rays pass through respective lens 150-1, 150-2 associated with respective cameras 100-1, 100-2. FIG. 7 also depicts graphically the transformation of two-dimensional coordinates $(x_c, y_c)$ from the individual camera (100-1, 100-2) image planes 170'-1, 170'-2 (see also FIGS. 5A, 5B, 5C) to a common global coordinate system $(x_w, y_w, z_w)$ that preferably is referenced to device 10, e.g., perhaps a corner of the device. Arrowed lines 87-1, 87-2 depict the direction of these transformations, which involve the vector (R,T) transformation described earlier herein.

An exemplary description as to the theory of operation of algorithm module 240 is given below, in conjunction with the description of FIG. 7. Logic circuit 250 preferably broadcasts synchronization signals to cameras 100-1, 100-2, etc. via line 251 under program or instruction from CPU 260 in processor system 240. Alternatively, one camera, perhaps 100-1, can assume the role of a controller and send a synchronization signal to other cameras, 100-2, etc., substantially replacing the role of controller logic 250 in controller system 230. Captured image data awaits its turn to send frame information via the DATA line to controller module 230, or optionally nearly simultaneously directly to processor module 240 via circuit logic module 250. Controller module 230 in turn sends aggregated data frames via line 253 to CPU 260. Embodiments of the present invention can encompass a variety of data line protocols, e.g., MIPI, I2S, USB 2.0, USB 3.0, and a variety of controller line protocols including without limitation industry standards such as I2C, USB. Wireless control lines including Bluetooth could be employed if acceptable latency can be provided, e.g., 1 ms, at sufficiently low cost commensurate with the low overall cost to implement the present invention. In FIG. 7, bus bandwidth should transmit data frames at a rate commensurate with the application for which device 10 is used. For example, if camera sensor array 170 (FIG. 4) has 640×480 pixel sensors $p_{(x,y)}$ and transmits at 30 frames per second with 24 bits per pixel, then needed bandwidth is slightly more than 221 Mbits per second. Cumulative bandwidth requirements increase when frame data is aggregated from sensor arrays in other cameras, e.g., 100-2.

However this estimate can be overestimation in that actual (e.g., USB level) bandwidth calculation depends on the transmission encoding used by the camera to transmit out data, and how and where the RGB pixel is constructed.

In FIG. 7, signals on the CONTROL line can govern the sending and receiving of synchronization signals with cameras 100-1, 100-2, etc. comprising the camera grid. Synchronization may be a simple signal propagated in the grid to control the start and stop of exposure for the cameras. CONTROL signals may also be used to synchronize camera exposure time with on-time of any external active light source 140 (see FIG. 2A) that is activated periodically, etc. Various communications architecture and protocols may be used, including daisy-chaining.

In FIG. 7, cameras 100-1, 100-2 may be disposed behind a protective glass or plastic 65 that optionally overlies display surface 60. So doing provides a remote control device 10 with three-dimensional landmark sensing without adding significantly to the device thickness. Controller system 230 includes logic units 250, 252 that collect acquired images for processor module 240 to process visual information obtained from cameras 100-1, 100-2 to interpret and understand the user's intention communicated by the detected gesture, e.g., take this action here, move this displayed object there, etc. The user intention may include implied positional and gestural information. For instance, the user intention may be verbally described as "open this folder," or "move this object from here to there on the display screen." By way of example, an "open" intention may be defined as an open hand gesture made by the user within the hover zone. In processor module 240, software algorithm 272 can analyze in two-dimensions the shape of the image acquired from each camera of the user's hand and determine user intent to open something, perhaps a door if dumb appliance 30" is within range. This could be accomplished without need for positional information to determine that the user wants to open something. If the image acquired by one camera is vague (non-conclusive), the image(s) from the other camera(s) can be used to increase confidence in detecting an open gesture In the above example, the recognition algorithm must determine what is meant by "this," "here" and "there." Relevant clues can be obtained by determining the position of the user hand (or perhaps pose of user head) with respect to some real world objects or icons 80 displayed by smart appliance 30 (see FIG. 2A). Further, images from multiple cameras are available to reconstruct a three-dimensional view, for which relative position of objects in the real world can be determined. Thus, embodiments of the present invention can be optimized for two-dimensional and three-dimensional recognition using ordinary two-dimensional cameras disposed in an application-optimized manner with respect to a monitor display or passive surface. Such systems avoid the burden associated with a custom three-dimensional acquisition method, with attendant higher cost, size, and complexities Recognition algorithm 272 in processor system 240 identifies key landmarks of the gesture or pointer object in the image acquired by the cameras. For instance, for a finger that is pointing to an object on the surface (e.g. tennis racket 70' on display screen 60 in FIG. 2A), preferably the wrist and hand are first identified, and then the finger(s). One of the user's fingers can be designated as a primary finger, a recognition that can be accomplished in the pixel array (x,y) image plane (see FIG. 5A) of at least one of the cameras. An important landmark is the sub (pixel) address (i.e., sub-pixel row and sub-pixel column in the camera pixel array) that represents the tip of the finger and the longitudinal axis that defines the finger's orientation. Of course in the camera image plane the axis is a projection of the actual axis of the fingertip in the three-dimensional hover zone near the monitor screen surface. The three-dimension estimation of axes is produced by intersecting corresponding rays from another camera, as explained herein. The axis need not be a straight line and can follow the natural curvature of the finger. When multiple fingers are involved in a gesture, the same definition applies to the tip of all visible fingers.

In practice, the (sub) pixel tip location of the finger in the camera image plane provides necessary but not sufficient information to locate the actual fingertip location of the user in some known world coordinate system (e.g., upper left corner of the monitor display screen). However, similar information can be acquired substantially simultaneously from multiple cameras. This information with a priori knowledge of camera calibration information enables estimating actual location of the user fingertip. This information can be used by another module, e.g., 270, 272, 274 in processor system 240 to generate user-interface events to be wirelessly transmitted via transceiver 280 in device 10, 10' to an appropriate appliance, e.g., 30, 30', 30", etc.

Figure 8:
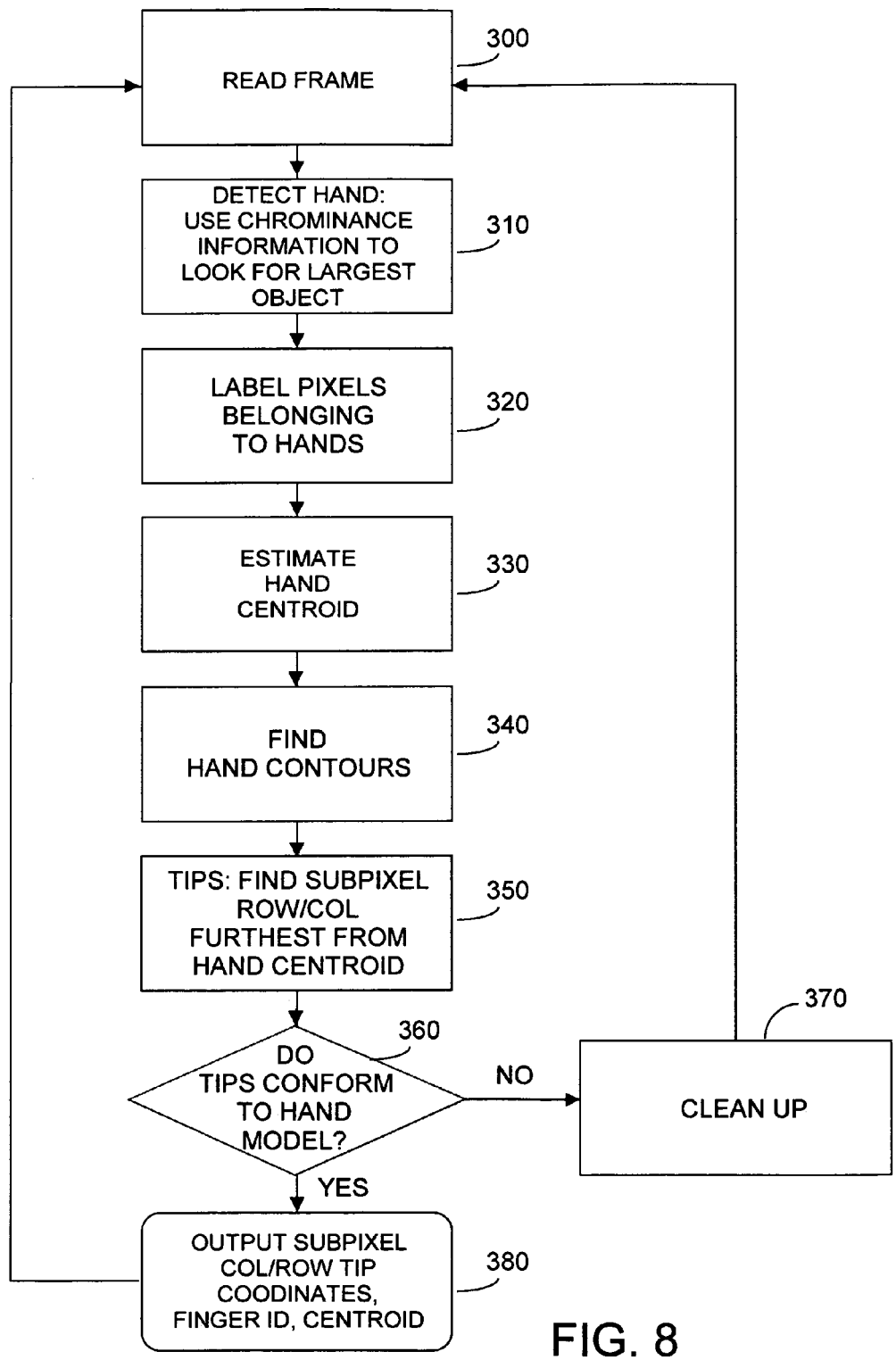
FIG. 8 is a flow chart depicting exemplary method steps in detecting a fingertip landmark, according to embodiments of the present invention.

FIG. 8 depicts an exemplary flow chart for detection of a user's fingertips using the image from a single camera. The steps depicted in FIG. 8 are preferably carried out within processor system 45 (see FIG. 7) and/or external auxiliary processor system(s) 45' (see FIGS. 1, 2A, 3). FIG. 8 describes detection of fingertip landmarks; however a similar method flow applies to detection of other landmarks, perhaps user's arms, head, etc. In FIG. 8, at method step 300, camera frame information is read into a buffer in processor memory, e.g., memory 270 in FIG. 7. If camera 100-1 can acquire RGB information, hand color is an identifying clue to help recognize that the user object is a hand, although hand color can change under different ambient lighting conditions. Therefore, step 310 uses chrominance ("UV") information, which is independent of luminance, to detect pixels matching hand color. Other clues such size and shape of the object can provide additional information for algorithm 274 (FIG. 7) to identify the pixels that are part of the user's hand. In step 320, pixels that are part of the hand are labeled after determining yes/no whether the pixel appears to belong to the hand image. At step 330, the hand centroid is estimated using the mass of pixels labeled as part of the hand at previous step 320. At step 340, the hand contour is determined. At step 350 data in the rows and columns in the camera pixel array are examined to determine the fingertips as being the data points farthest away from the hand centroid, determined at step 320. At step 360 a yes/no decision is made by algorithm 274 (FIG. 7), to verify that the resulting map of fingertip pixels indeed conform to the hand model. For instance, the count of the fingers in a single hand must not exceed five. If the fingertip arrangement does not conform to a hand model, step 370 performs a cleanup and returns to looking at the next frame at method step 300. Otherwise, if the fingertip data appears to conform to the hand model, the method progresses and step 380 outputs the location in the camera pixel array, preferably providing sub-pixel column/row array location, of the fingertip in the image plane. Step 370 also provides identification for each finger (e.g., thumb, index, middle, ring, little). Step 370 can also use other information in the finger orientation, i.e., are the finger axes straight or bent, etc.

Figure 9:
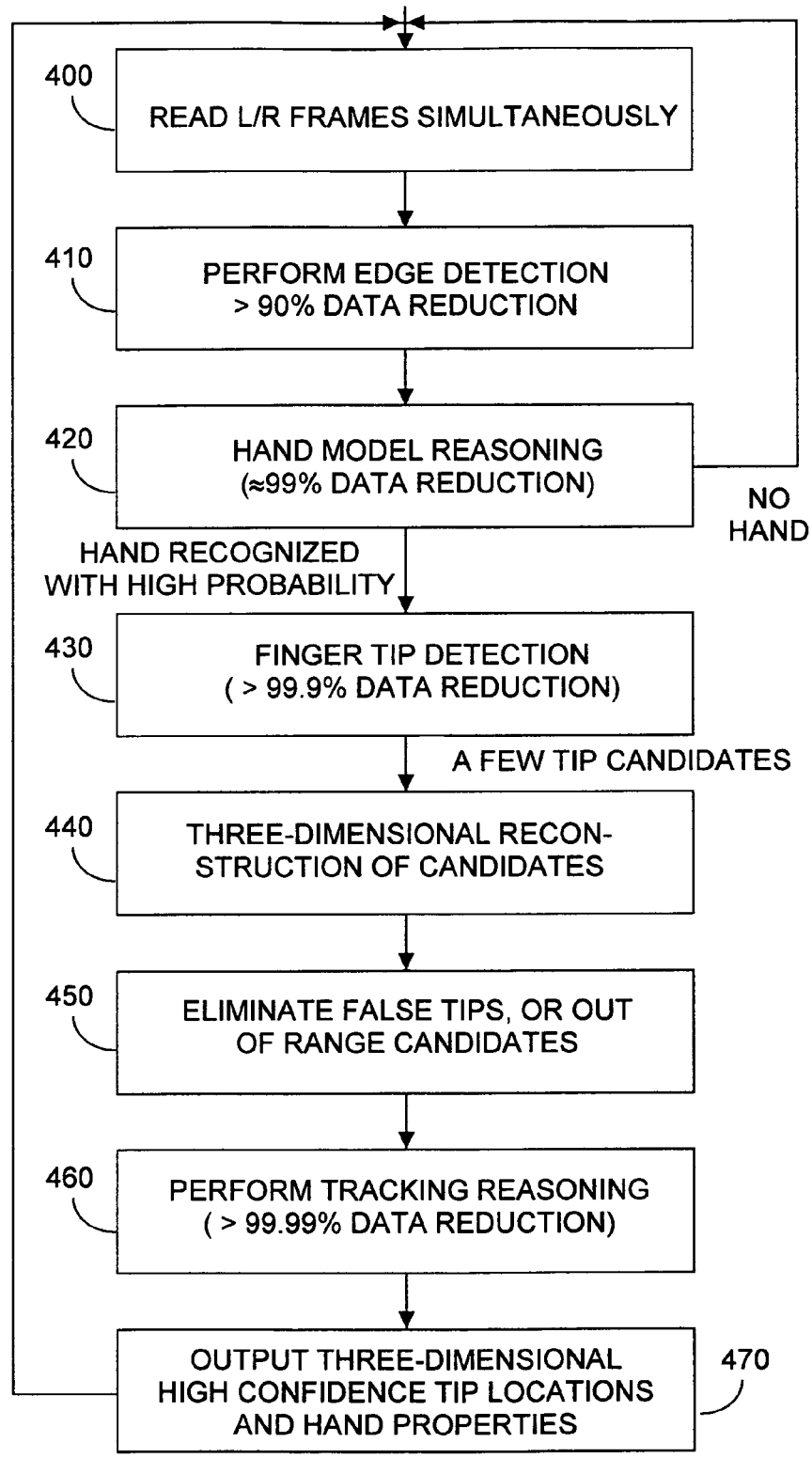
FIG. 9 is a flow chart depicting exemplary method steps for detecting a fingertip landmark using epipolar geometric analysis including image rectification, according to embodiments of the present invention.

FIG. 9 is a flow chart depicting exemplary method steps for detecting a fingertip landmark using epipolar geometric analysis including image rectification, according to the present invention. Method steps shown in FIG. 9 result from processor (e.g., CPU 260) execution of routine(s) 272, 274 (see FIG. 7) and produce three-dimensional coordinates for a relatively few landmark points. In FIG. 9, assume that the user object being imaged is a hand, although of course in practice other or additional objects could be imaged. At method step 400, frames of images acquired by spaced-apart cameras 100-1 and 100-2 are read substantially simultaneously, preferably within about ±1 ms. At method step 400, a substantially large number (N) of data points is dealt with, comprising at most data from all pixels in the sensor array for camera 100-1, and all pixels in the sensor array for camera 100-2. N is potentially very large as pixel resolution may range from perhaps 640×480 for a VGA camera array to 1280×720 for a HD 720p array. Output data from high resolution sensor arrays can be compressed to reduce data bandwidth requirements, but too much compression can result in undesired image artifacts that can interfere with the detection algorithms. Trial and error experimentation with compression levels is recommended.

Method step 410 seeks to extract features of the acquired imagery that are relevant to identifying landmarks associated with a particular natural interface detection scenario. Without loss of generality, assume for ease of description that a goal is to find and accurate track the $(x_w, y_w, z_w)$ location in three-dimensional space of a pointed index fingertip of the user of remote control device 10. Such use of an index finger is a natural way for humans to indicate directions, to identify a specific object, etc. A feature that helps finding a pointed index finger is the contour of the shape of the index finger connected to the rest of the user hand. In practice, at method step 410, edges of objects, e.g., hands, fingers, fingertips, in the frames acquired in step 400 are detected using an edge detection algorithm that reduces the acquired image to a description of a series of continuous edges. The edge identification procedure can be performed on frame data from camera 100-1, and optionally be repeated for the simultaneously acquired frame from camera 100-2. The edge detection algorithm typically applies gradient filters and computes edges by computing gradient magnitudes and directions. Method step 410 advantageously can reduce the number of candidate pixels where a hand object can be found by 90% or more. Coming out of step 410, the potential landmark points reside in the typically 10% or less of the number N data points that remain.

At method step 420, intelligent user hand model reasoning is applied. For example an index finger has to be part of a user hand, and if a hand object is not found and identified, it is most unlikely an index finger will be found. In preferred embodiments of the present invention, the existence of a hand object with an extended index finger in a particular region of the image comprising edges (and perhaps color information) is expressed with a probability. If a hand object with an extended finger is found with a relative high probability (e.g. >80% to 90%), the algorithm continues to method step 430. Otherwise, if a hand object is not recognized with high probability, the routine branches back to step 400, to fetch the next frame of image data. Preferably step 420 does not include a high threshold probability of finding a hand object, to preclude a high incidence of false negatives. False negatives imply there is a hand object in the image, but the algorithm does not detect it. It is preferable to reject subsequently in the processing flow an incorrect decision made at step 420. So doing does not increase false alarms or false positive, meaning a hand object is not in the image but the algorithm detects something that it incorrectly assumes to be a hand. In practice, method step 420 typically eliminates about 99% of the pixels in the original frame acquired at step 400. This is of course a substantial reduction of data, which promotes rapid data processing of landmark data, using inexpensive hardware, while enjoying substantially reduced latency times. Thus at step 420 a decision can be made with reasonably high probability as to whether the imaged object is or is not a hand. In step 420, the candidate landmark points reside is a set of data that is now culled down to about 1% or less of the number N referred to method step 400.

Method step 430 undertakes detection of a fingertip on the hand object. Preferably a reasoned basis for detection assumes certain hand and fingertip characteristics, for the current example being described. For example, an extended index finger typically appears as a cylinder shape extending outwardly from a roughly rectangle shape of folded fingers, with the distal end of the cylinder shape being a fingertip location. Method step 430 can reduce the list of candidate pixels potentially representing the fingertip by about at least 99.9% and more typically by at least 99.99%. Thus in step 430, the candidate landmark points reside is a set of data that is now culled down to about 0.1% or less of the number N referred to method step 400, and more preferably to about 0.01% or less. By way of example, if step 400 pertained to a frame of VGA resolution data, following step 430, perhaps thirty pixels will survive as candidates for the fingertip location. Understandably it is important to select a point location in the potential fingertip that is uniquely identifiable in image frame data from both cameras. An exemplary point would be the maxima of the crescent shape that defines a fingertip. Note that the found shape of a fingertip ensures there will be an uppermost point, even if the finger is pointed at an angle with respect to the cameras. Thus, data passing method step 430 will contain potential candidates for objects strongly believed to include a fingertip on the detected hand object.

Understandably substantial data for processing has already been eliminated, and method step 440 undertakes three-dimensional reconstruction for the relatively few candidates that probably represent a fingertip of the user hand object. This three-dimensional reconstruction will identify the ($x_w$, $y_w$,$z_w$) real-world coordinates for the set of candidates that have survived method step 430. Intrinsic and extrinsic camera parameters including calibration parameters can be used, and can justify application of epipolar line geometric analysis to disambiguate candidates, as described herein with respect to FIGS. 5B-5G.

At method step 450 additional data is discarded for objects believed to be false fingertips, or objects that are out of distance boundary range of the overlapping FOVs of cameras 100-1, 100-2 to represent a fingertip. For example if the overlapping FOVs of the camera defines an operational imaging range of say 100 cm, then candidate landmark points that appear to be farther than 100 cm from the cameras are either too far away to be a valid fingertip, or the method has produced invalid data.

Method step 460 performs reasoned analysis on the dynamic behavior of surviving fingertip candidates. At this juncture, the present invention has information about the location of the best estimate of the fingertip from the previous frame of data from cameras 100-1, 100-2. The present invention also has data regarding the trajectory and perhaps an assumption as to speed of the probable fingertip. This information from the previous data frame, obtained earlier at step 400, can provide good hints about choosing the location of the most likely fingertip in the current frame of data. Using the original size of the frame as a reference, the results of method step 460 can generally eliminate at least 99.99% of the data, and more typically at least 99.999% of the data. Thus with respect to the number N referred to at step 400, step 460 can reduce the data to about 0.001% of N or better, and preferably to about 0.0001% of N or better. The remaining relatively few fingertip locations are passed with high confidence to method step 470 for output used to produce natural interface three-dimensional input events for host application 50 (or equivalent). At method step 470, each of the potential landmark locations can be characterized with confidence probabilities as being a type of user object. For example, perhaps landmark point C (see FIG. 2A) has a 95% probability of being a user right index finger, and a 5% probability of being another finger. Software associated with method step 470 ultimately makes the final decision. Output from method step 470 could be used as input to interact with a true three-dimensional application that renders a true three-dimensional output.

Figures 10A, 10B:
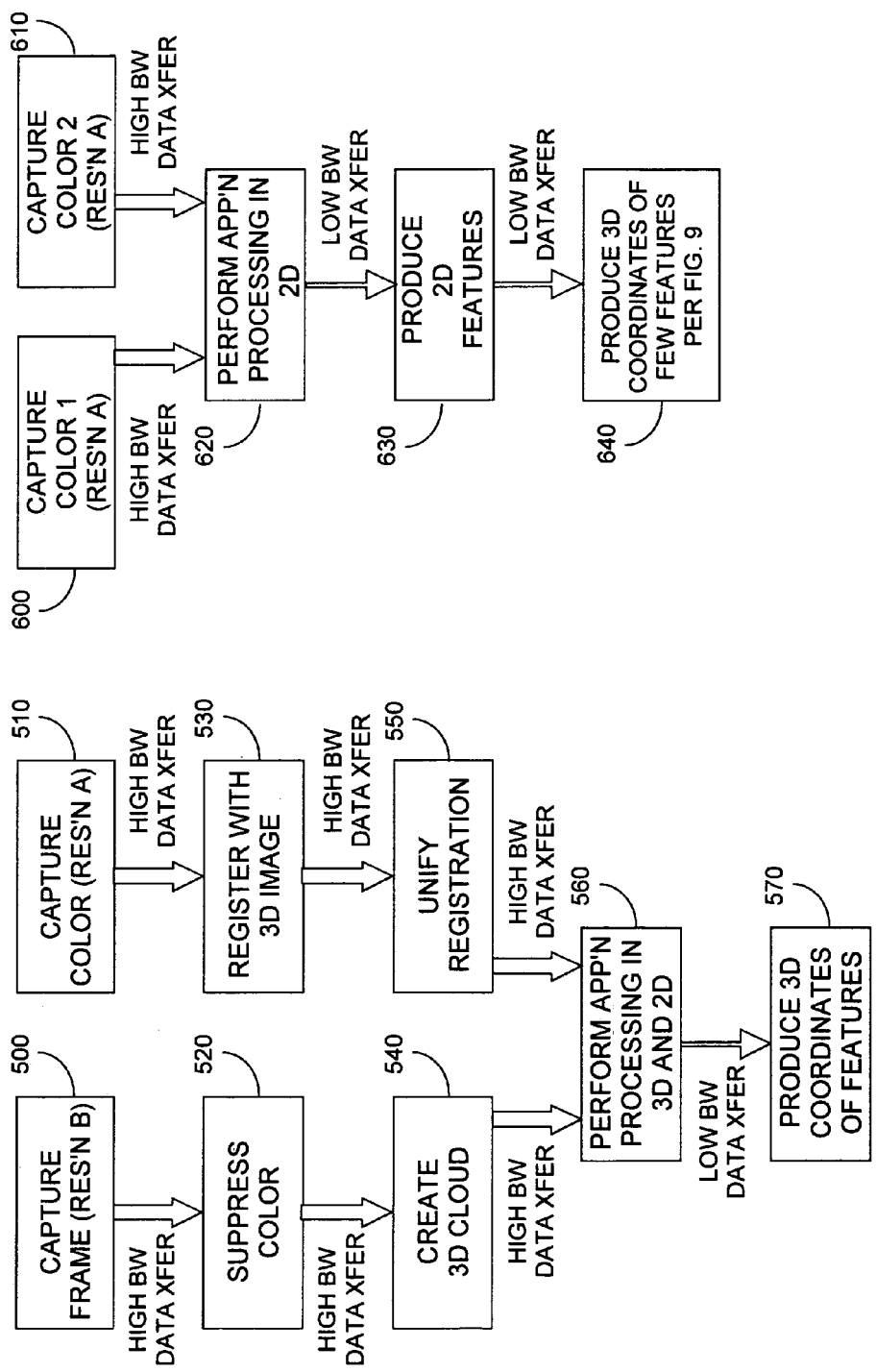
FIG. 10A depicts the many process steps and associated high bandwidth data rate requirements associated with three dimensional sensing methods according to the prior art.
FIG. 10B depicts the relatively fewer process steps and associated low bandwidth data rates to acquire three-dimensional coordinates for a relatively few landmark points, according to embodiments of the present invention.

It is useful to recapitulate some of the advantages of the present invention with reference to FIGS. 10A and 10B. FIG. 10A depicts major processing steps and many high data bandwidth requirements for a traditional prior art gesture recognizing system using full three-dimensional sensors. FIG. 10B depicts the major processing steps and relatively few high data bandwidth requirements for gesture sensing according to embodiments of the present invention.

In FIG. 10A, the prior art method at steps 500 and 510 captures frame data and color data, but at two different resolutions, high resolution A, perhaps RGB, and lower resolution B, perhaps z-pixel. A high bandwidth data transfer is required to couple the data from steps 500, 510 to respective steps 520, 530. At step 520 color information is suppressed, and at step 530, registration with a three-dimensional image occurs. (As will be described shortly with respect to FIG. 6B, neither of these steps is required in the present invention.) In FIG. 10A again high bandwidth data transfer is required to couple information from steps 520, 530 to respective steps 540, 550. At step 540 a full three-dimensional cloud is created and at step 550 resolutions between high resolution A and lower resolution B are unified. However as described with respect to FIG. 10B, neither of these steps is required in the present invention. Yet again high bandwidth data transfers are required to couple information from steps 540, 550 to step 560, whereas application processing occurs in both three-dimensions and two-dimensions. The output from step 560 is then coupled via a low bandwidth data transfer to step 570, where three-dimensional coordinates are generated for the features captured by the prior art system.

Compare now FIG. 10B. At method steps 600, 610 image capture occurs at a common resolution for two cameras, e.g., 100-1, 100-2. A high bandwidth data transfer then couples this information to step 620, which performs application processing in two-dimensions. The step 620 is somewhat analogous to step 560 in prior art FIG. 10A, but note how many intermediate processing steps and attendant high bandwidth data transfer paths have been eliminated in FIG. 10B. In FIG. 10B a low bandwidth data transfer couples information from step 620 to step 630, where two-dimension features are produced. A low bandwidth data transfer then couples information from step 630 to step 640 where three-dimensional coordinates are produced, but only for a few landmark features in the images acquired by the cameras. Method steps 600-640 in FIG. 10B are further described with respect to FIG. 9

Those skilled in the art will appreciate that acquisition systems that use other than optical energy may be used with embodiments of the present invention. Those skilled in the art will appreciate that a remote control device according to embodiments of the present invention may be used to control appliances other than those explicitly described herein.

Modifications and variations may be made to the disclosed embodiments without departing from the subject and spirit of the invention as defined by the following claims.

What is claimed is:

1. A method to enable at least one user interaction made in a three-dimensional hover zone to be recognized by a hand holdable remote control device that creates a detectable event, corresponding to said interaction, useable to remotely control an appliance, the method including the following steps:
   (a) providing said hand holdable device system with an acquisition system that includes at least a first camera have a first FOV to acquire at least a number N of data points of two-dimensional image information of at least a portion of said user in said FOV, each said camera being attached to said remote control device;
   wherein said at least first camera has a characteristic selected from a group consisting of (i) said camera is a time-of-flight (TOF) camera that acquires three-dimensional image information of at least a portion of said user, (ii) said first camera includes a structured light camera system, and (iii) said camera is a two-dimensional camera that acquires two-dimensional image information of at least a portion of said user;
   (b) processing said at least two-dimensional image information acquired from each said camera at step (a) so as to represent an imaged portion of said user using a set of landmark points sufficient to recognize a gesture made by said user, said processing discarding at least about 90% of said number N data points;
   said landmark points being three-dimensional if said acquisition system includes at least one of (i) a TOF camera, (ii) at least two two-dimensional cameras, and (iii) a structure light system; and
   said landmark points being two-dimensional if said acquisition system includes only one two-dimensional camera;
   wherein said processing has at least one characteristic selected from a group consisting of (i) processing occurs within said remote control device, (ii) processing occurs externally to said remote control device, and (iii) at least a portion of said processing occurs within said remote control device and at least a portion of said processing occurs externally to said remote control device;
   (c) translating each user gesture identified in step (b) to a command to control said appliance, wherein said translating has a characteristic selected from a group consisting of (i) translating occurs within said remote control device, (ii) translating occurs externally to said remote control device, and (iii) at least a portion of said translating occurs within said remote control device and at least a portion of said translating occurs externally to said remote control device; and
   (d) transmitting each said user gesture translated in step (c) to said appliance to control at least one aspect of said appliance, wherein said transmitting has a characteristic selected from a group consisting of (i) transmitting occurs within said remote control device, (ii) transmitting occurs externally to said remote control device, and (iii) at least a portion of said transmitting occurs within said remote control device and at least a portion of said transmitting occurs externally to said remote control device.

2. The method of claim 1, wherein at step (a) said acquisition system includes a first two-dimensional camera having a first FOV and a second two-dimensional camera having a second FOV, each of said first and said second camera attached to said remote control device such that said three-dimensional hover zone is defined by an intersection of said first FOV and said second FOV.

3. The method of claim 2, wherein:
   at step (a) said first camera has a first pixel sensor array with a first resolution, and said second camera has a second pixel sensor array with a second resolution, said first camera and said second camera being disposed on said remote control device;
   at step (b) said processing extracts from said number N of data points a lesser number of three-dimensional landmarks, wherein magnitude of said three-dimensional landmarks has a characteristic selected from a group consisting of (i) said magnitude ≤100, (ii) said magnitude ≤50, and said magnitude ≤12; and
   wherein said second pixel sensor array has at least one characteristic selected from a group consisting of (i) said second resolution is substantially equal to said first resolution, (ii) said second resolution differs from said first resolution, (iii) wavelength sensitivity of said second pixel sensor array is substantially identical to wavelength sensitivity of said first pixel sensory array, (iv) wavelength sensitivity of said second pixel sensor array differs from wavelength sensitivity of said first pixel sensory array, (v) said second pixel sensor array is sensitive to RGB wavelengths, (vi) said second pixel sensor array is sensitive to gray scale wavelengths, (vii) said second pixel sensor array is sensitive to IR wavelengths, and (viii) wavelength sensitivity of said first pixel sensor array and wavelength of said second pixel sensor array are sensitive to IR wavelengths.

4. The method of claim 3, wherein processing at step (b) has at least one characteristic selected from a group consisting of (i) processing reduces acquired image information to ≤1% N, (ii) processing reduces acquired information to ≤0.1% N, and (iii) processing reduces acquired information to ≤0.01% N.

5. The method of claim 2, wherein processing at step (b) includes at least one processing step having a characteristic selected from (i) said processing includes edge detection, (ii) said processing includes object modeling, (iii) said processing includes image rectification, (iv) said processing includes epipolar geometric analysis, and (v) said processing includes machine learning.

6. The method of claim 1, wherein said landmark has at least one characteristic selected from a group consisting of (i) said landmark is approximate centroid of said user's head, (ii) said landmark is approximate centroid of said user's hand, (iii), said landmark is approximate centroid of said user's finger, (iv) said landmark is approximate location of said user's fingertip, and (v) said landmark is approximate location of said user's shoulder joint.

7. The method of claim 1, wherein:
said appliance includes an appliance display screen; and
said handholdable device includes a device display screen that replicates at least in part an image rendered by said appliance on said appliance display screen.

8. The method of claim 1, wherein said appliance has a characteristic selected from a group consisting of (i) said appliance includes a smart TV, (ii) said appliance includes a computer system, (iii) said appliance includes a set top box, (iv) said appliance includes a game console, (v) said appliance includes a kiosk, (vi) said appliance includes a signage unit, (vii) said appliance includes a lighting system, (viii) said appliance includes a locking system, and (ix) said appliance is remotely switchable between at least two states.

9. The method of claim 1, wherein said three-dimensional hover zone has at least one characteristic selected from a group consisting of (i) said zone includes a user-facing surface of said hand holdable remote control as well as a three-dimensional region extending outwardly from said user-facing surface of said hand holdable remote control device;
wherein said handholdable remote control device enables at least one user interaction having a characteristic selected from a group consisting of (i) said interaction includes a user gesture that physically contacts said user-facing surface of said hand holdable remote control device, (ii) said interaction includes a user gesture made in a region of said three-dimensional hover zone without physically touching said user-facing surface of said hand holdable remote control device, and (iii) said interaction includes user movement in said hover zone, said movement terminating at said user-facing surface of said hand holdable remote control device.

10. The method of claim 2, wherein at least said first two-dimensional camera includes an in-camera controller-processor; and
wherein said means for processing can access said in-camera controller-processor to carry out at least one preliminary processing step towards reducing said number N of data points.

11. A handholdable remote control device to enable at least one user interaction, made in a three-dimensional hover zone, with an appliance, said interaction creating a detectable event useable by said appliance, where at least a portion of said user is representable by at least one three dimensional landmark, the handholdable remote control device including:
an acquisition system comprising at least a first two-dimensional camera having a first FOV and a first resolution, and a second two-dimensional camera having a second FOV and a second resolution, said first and second camera disposed on said remote control device such an intersection of said first FOV and second FOV defines said three-dimensional hover zone, said acquisition system acquiring at least a number N of data points of two-dimensional image information from at least a portion of said user in said three-dimensional hover zone;
means for processing said at least two-dimensional image information acquired from said acquisition system so as to represent an imaged portion of said user using a set of three-dimensional landmark points sufficient to recognize a gesture made by said user, said means for processing discarding at least about 90% of said number N data points;
wherein said means for processing has at least one characteristic selected from a group consisting of (i) said means for processing is disposed within said handholdable remote control device, and (ii) at least a portion of said means for processing is disposed external to said handholdable remote control device;
means for translating each user gesture recognized by said means for processing to a command to control said appliance, said means for translating disposed within said handholdable remote control device;
wherein said means for translating has a characteristic selected from a group consisting of (i) said means for translating is disposed within said handholdable remote control device, (ii) translating occurs externally to said remote control device, and (iii) at least a portion of said translating occurs within said remote control device and at least a portion of said translating occurs externally to said remote control device; and
a transmitting system to transmit each said user gesture translated by said means for translating to said appliance to control at least one aspect of said appliance, wherein said transmitting system has a characteristic selected from a group consisting of (i) said transmitting system is disposed within said handholdable remote control device, (ii) at least a portion of said transmitting system is disposed externally to said handholdable remote control device, and (iii) at least a portion of said transmitting system is disposed within said handholdable remote control device and at least a portion of said transmitting system is disposed externally to said handholdable remote control device.

12. The handholdable device of claim 11, wherein:
said first camera has a first pixel sensor array with a first resolution, and said second camera has a second pixel sensor array with a second resolution;
wherein said second pixel sensor array has at least one characteristic selected from a group consisting of (i) said second resolution is substantially equal to said first resolution, (ii) said second resolution differs from said first resolution, (iii) wavelength sensitivity of said second pixel sensor array is substantially identical to wavelength sensitivity of said first pixel sensory array, (iv) wavelength sensitivity of said second pixel sensor array differs from wavelength sensitivity of said first pixel sensory array, (v) said second pixel sensor array is sensitive to RGB wavelengths, (vi) said second pixel sensor array is sensitive to gray scale wavelengths, (vii) said second pixel sensor array is sensitive to IR wavelengths, and (viii) wavelength sensitivity of said first pixel sensor array and wavelength of said second pixel sensor array are sensitive to IR wavelengths.

13. The handholdable remote control device of claim 11, wherein:
said means for processing processes said at least two-dimensional image information acquired from each said camera so as to represent an imaged portion of said user using a set of landmark points sufficient to recognize a gesture made by said user, said means for processing discarding at least about 90% of said number N data points.

14. The handholdable remote control device of claim 11, wherein:
said means for processing processes said at least two-dimensional image information acquired from each said camera so as to represent an imaged portion of said user using a set of landmark points sufficient to recognize a gesture made by said user; wherein said means for processing has at least one characteristic selected from a group consisting of (i) processing reduces acquired image information to $\leq 1\%$ N, (ii) processing reduces acquired information to $\leq 0.1\%$ N, and (iii) processing reduces acquired information to $\leq 0.01\%$ N.

15. The handholdable remote control device of claim 11, wherein:
said means for processing carries out at least one procedure selected from a group consisting of (i) processing includes edge detection, (ii) processing includes object modeling, (iii) processing includes image rectification, (iv) processing includes epipolar geometric analysis, and (v) processing includes machine learning.

16. The handholdable remote control device of claim 11, wherein said landmark has at least one characteristic selected from a group consisting of (i) said landmark is approximate centroid of said user's head, (ii) said landmark is approximate centroid of said user's hand, (iii), said landmark is approximate centroid of said user's finger, (iv) said landmark is approximate location of said user's fingertip, and (v) said landmark is approximate location of said user's shoulder joint.

17. The handholdable remote control device of claim 11, wherein said appliance includes an appliance display screen; and
said handholdable remote control device includes a device display screen that replicates at least in part an image rendered by said appliance on said appliance display screen.

18. The handholdable remote control device of claim 11, wherein said appliance has a characteristic selected from a group consisting of (i) said appliance includes a smart TV, (ii) said appliance includes a computer system, (iii) said appliance includes a set top box, (iv) said appliance includes a game console, (v) said appliance includes a kiosk, (vi) said appliance includes a signage unit, (vii) said appliance includes a lighting system, (viii) said appliance includes a locking system, and (ix) said appliance is remotely switchable between at least two states.

19. The handholdable remote control device of claim 11, wherein said three-dimensional hover zone has at least one characteristic selected from a group consisting of (i) said zone includes a user-facing surface of said hand handholdable remote control as well as a three-dimensional region extending outwardly from said user-facing surface of said handholdable remote control device;
wherein said handholdable remote control device enables at least one user interaction having a characteristic selected from a group consisting of (i) said interaction includes a user gesture that physically contacts said user-facing surface of said hand holdable remote control device, (ii) said interaction includes a user gesture made in a region of said three-dimensional hover zone without physically touching said user-facing surface of said handholdable remote control device, and (iii) said interaction includes user movement in said hover zone, said movement terminating at said user-facing surface of said handholdable remote control device.

20. The handholdable remote control device of claim 11, further including a feedback system to advise said user that a gesture has been recognized and subsequent control of said appliance has been successfully carried out.

\* \* \* \* \*